United States Patent
Fujimoto et al.

(10) Patent No.: US 6,332,046 B1
(45) Date of Patent: Dec. 18, 2001

(54) DOCUMENT IMAGE RECOGNITION APPARATUS AND COMPUTER-READABLE STORAGE MEDIUM STORING DOCUMENT IMAGE RECOGNITION PROGRAM

(75) Inventors: Katsuhito Fujimoto; Hiroshi Kamada; Koji Kurokawa, all of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/193,868

(22) Filed: Nov. 18, 1998

(30) Foreign Application Priority Data

Nov. 28, 1997 (JP) .................................................. 9-327625
May 28, 1998 (JP) ................................................ 10-146926

(51) Int. Cl.⁷ ...................................................... G06K 9/36
(52) U.S. Cl. ............................................ 382/289; 382/174
(58) Field of Search .................................... 382/174, 177, 382/180, 289, 290, 296

(56) References Cited

U.S. PATENT DOCUMENTS

| | | | |
|---|---|---|---|
| 4,926,490 | * | 5/1990 | Mano .......................................... 382/9 |
| 5,359,677 | * | 10/1994 | Katsurada et al. .................... 382/296 |
| 5,506,918 | * | 4/1996 | Ishitani .................................. 382/289 |
| 5,664,027 | * | 9/1997 | Ittner .................................... 382/289 |
| 5,781,660 | * | 7/1998 | Nitta et al. ............................ 382/289 |
| 5,854,854 | * | 12/1998 | Cullen et al. .......................... 382/296 |

FOREIGN PATENT DOCUMENTS

| | | |
|---|---|---|
| 1-183783 | 7/1989 | (JP) . |
| 2-170280 | 7/1990 | (JP) . |
| 5-174179 | 7/1993 | (JP) . |
| 7-192085 | 7/1995 | (JP) . |
| 10-31716 | 2/1998 | (JP) . |

OTHER PUBLICATIONS

Y. Nakano, et al, "A Fast Algorithm for the Skew Normalization of Document Images", *The Transactions of the Institute of Electronics & Communication Engineers of Japan*, vol. J69–D, No. 11.

* cited by examiner

Primary Examiner—Yon J. Couso
(74) Attorney, Agent, or Firm—Staas & Halsey LLP

(57) ABSTRACT

A document image tilt detection unit extracts a set of elements forming a character from a document image, extracts candidates for horizontal and vertical lines based on the character elements, estimates the reliability of each candidate for a line, and extracts a set of probable lines. Then, it estimates the tilt of the document image based on the arrangement of the character elements belonging to the line elements in the set of probable lines. A layout analysis unit extracts a set of lines in a fixed line direction from a set of basic elements forming the document image, and reciprocally performs the extraction of a column based on the correlation between lines and the extraction of a line based on the restrictions of the column. By providing the document image tilt detection unit and the layout analysis unit, the tilt of the document image containing both vertical and horizontal character lines can be detected, and lines and columns can be extracted at a high speed with high precision.

7 Claims, 26 Drawing Sheets

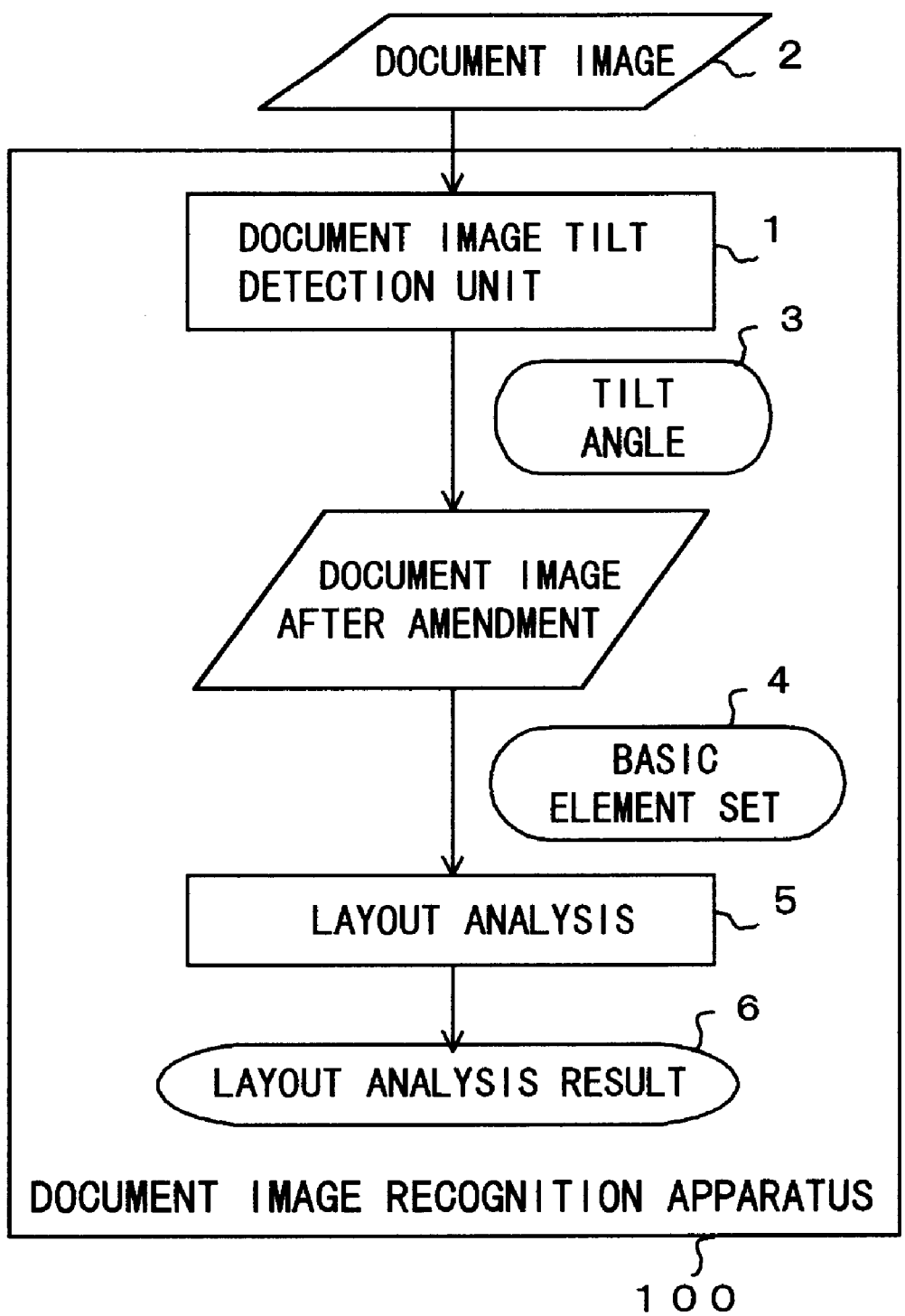
F I G. 2

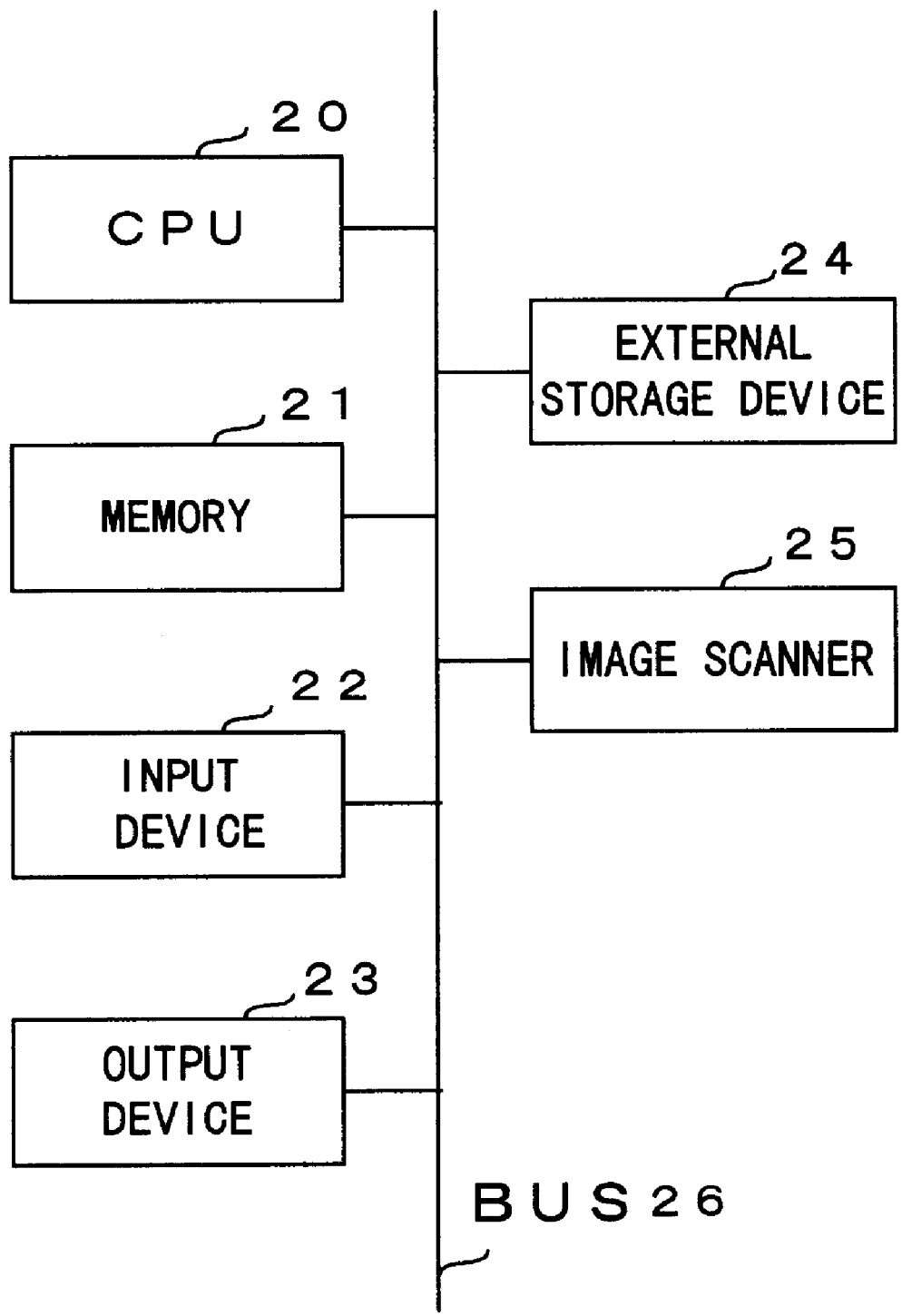
F I G. 3

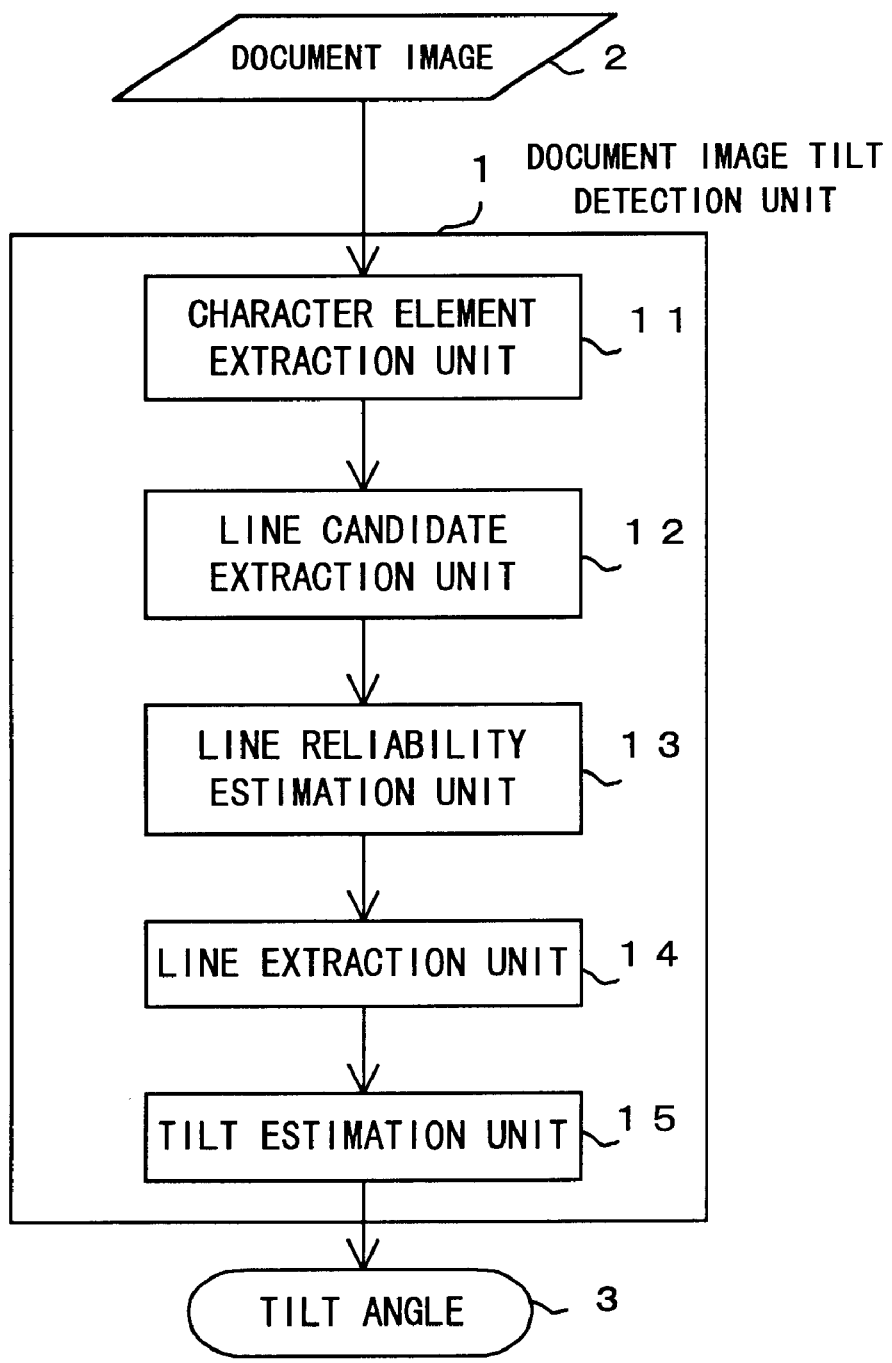
F I G. 4

60, 61 : RECTANGLE ENCLOSING THE CHARACTER ELEMENTS
62, 63 : LOWER SIDE OF ENCLOSING RECTANGLE

ONE CHARACTER   ONE CHARACTER   ONE CHARACTER   ONE CHARACTER   ONE CHARACTER

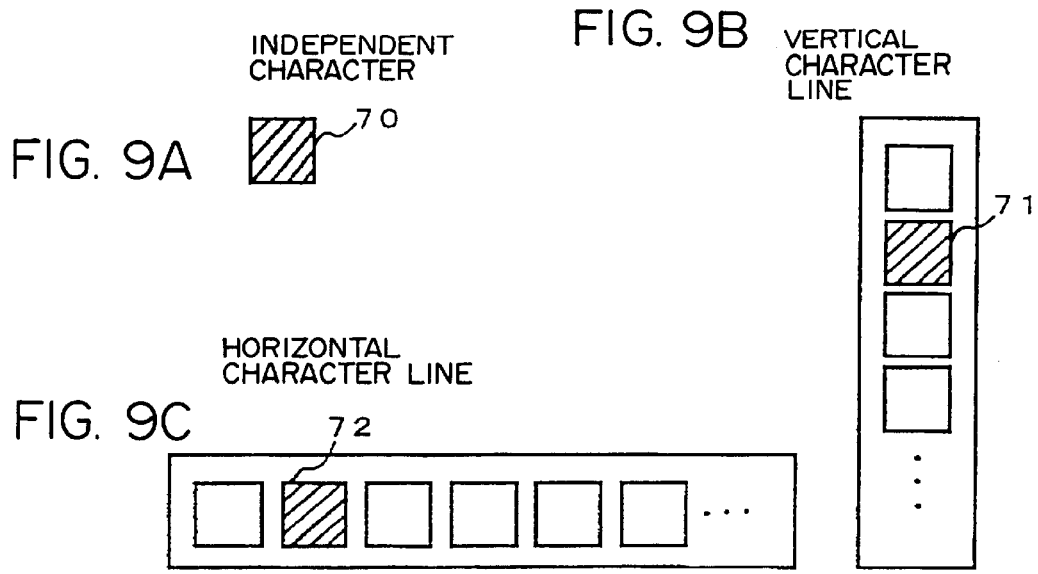
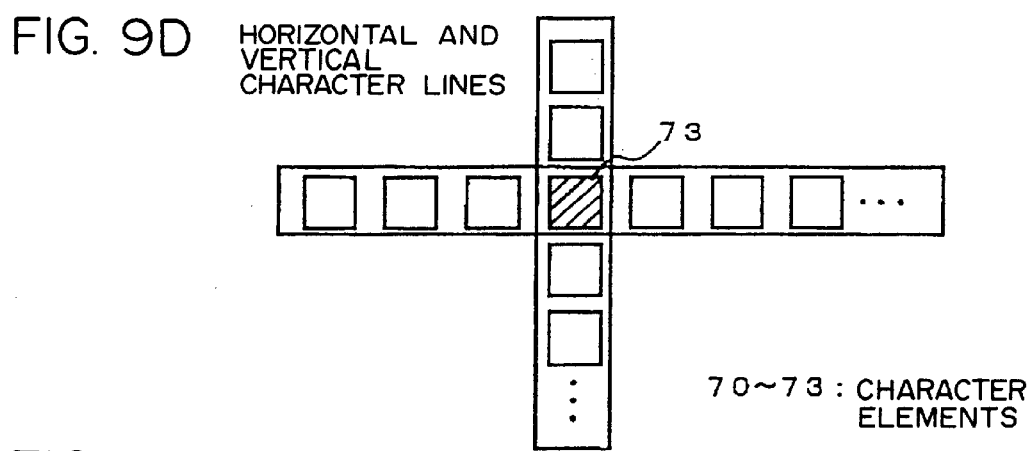
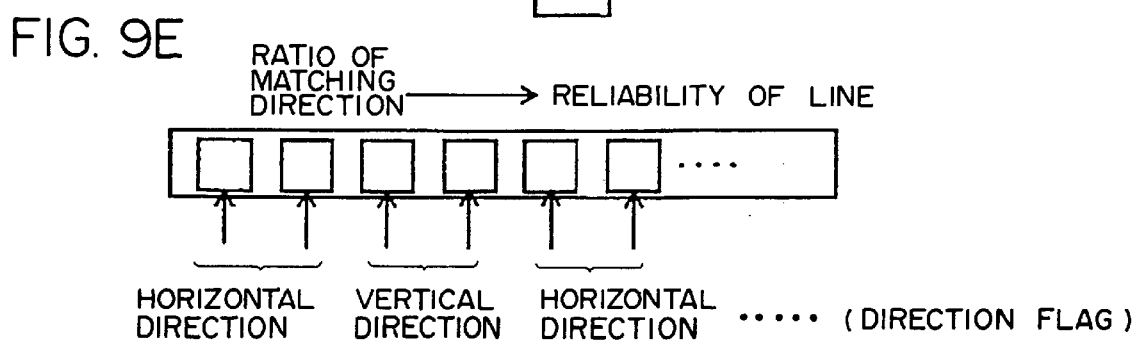

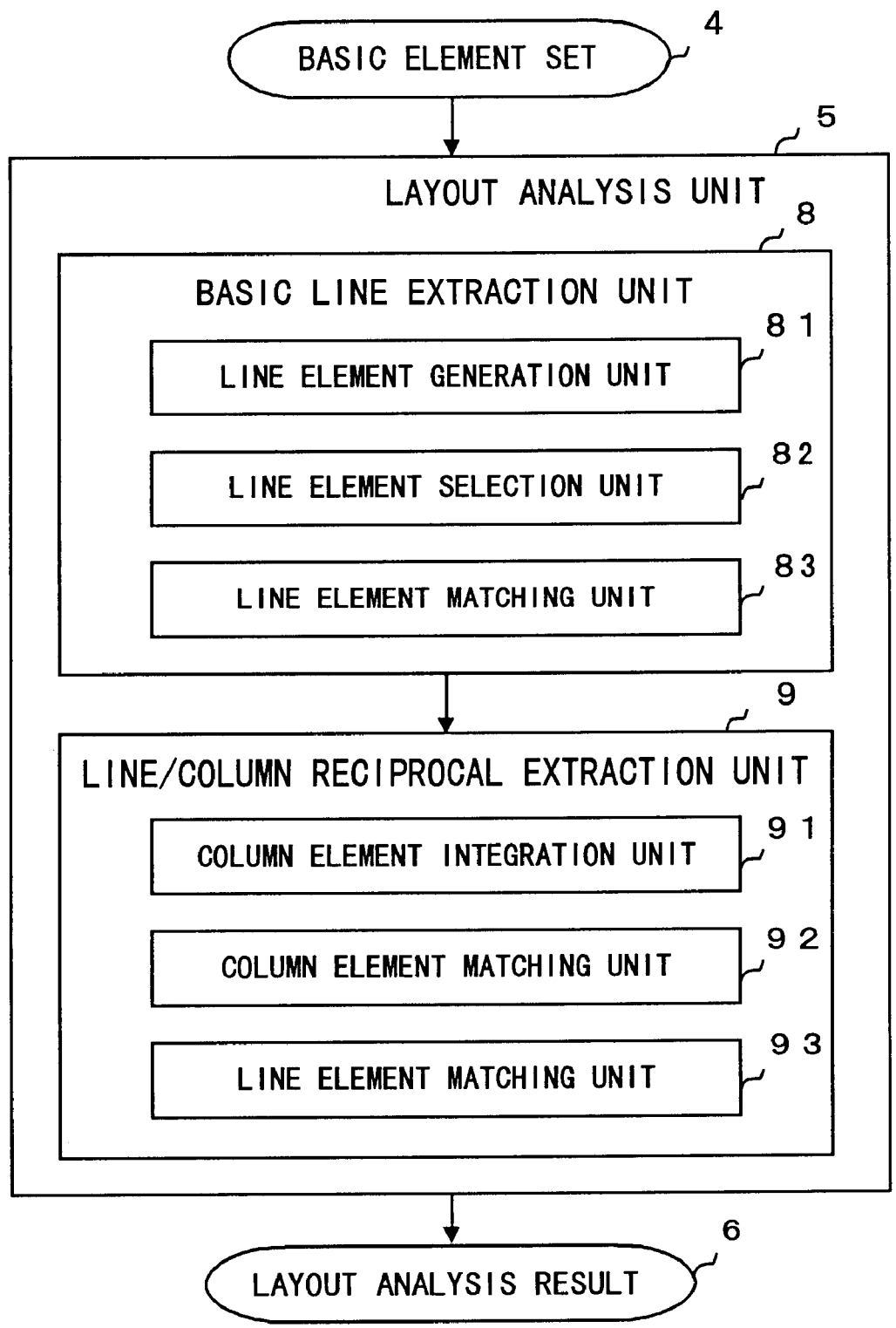
F I G. 10

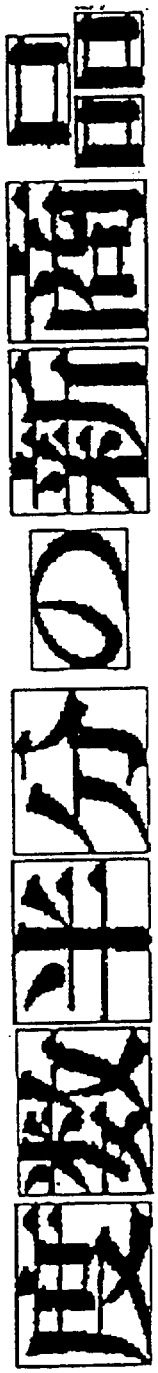
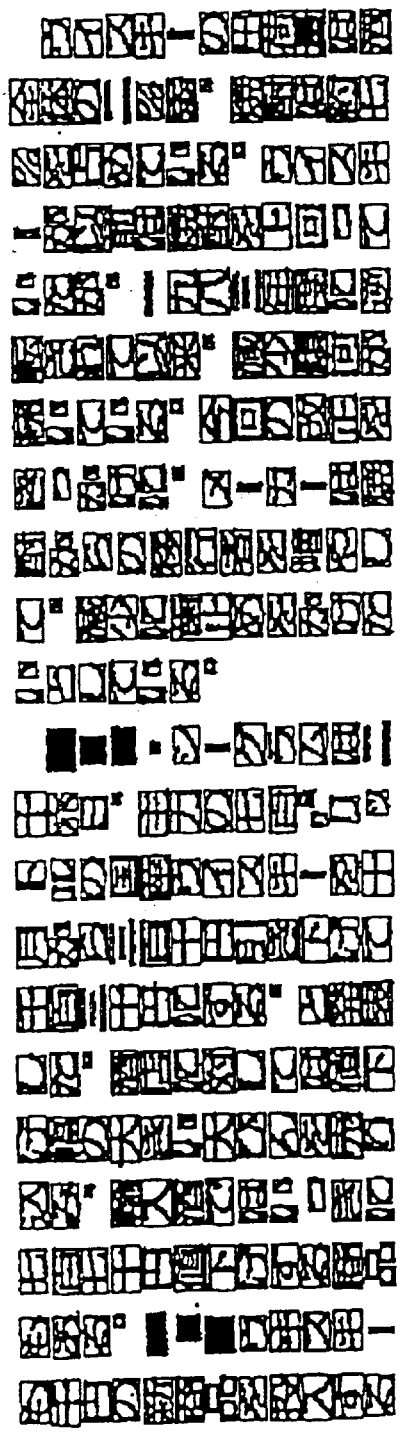
FIG. 13

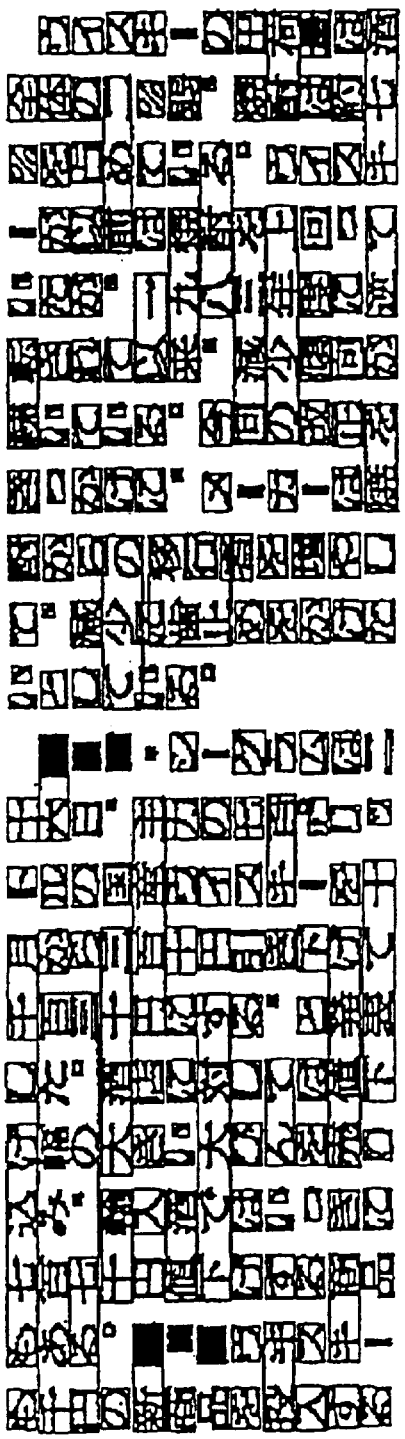
FIG. 14

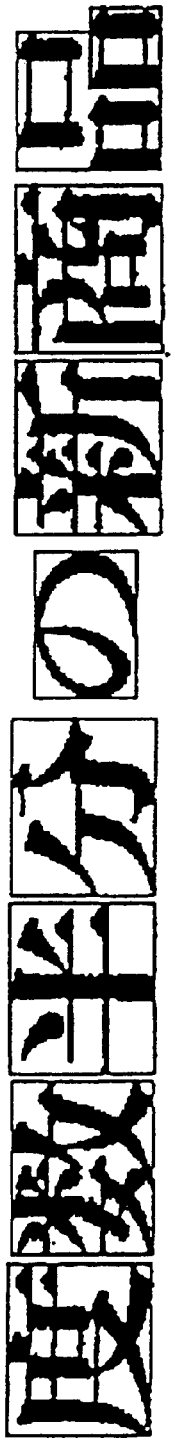
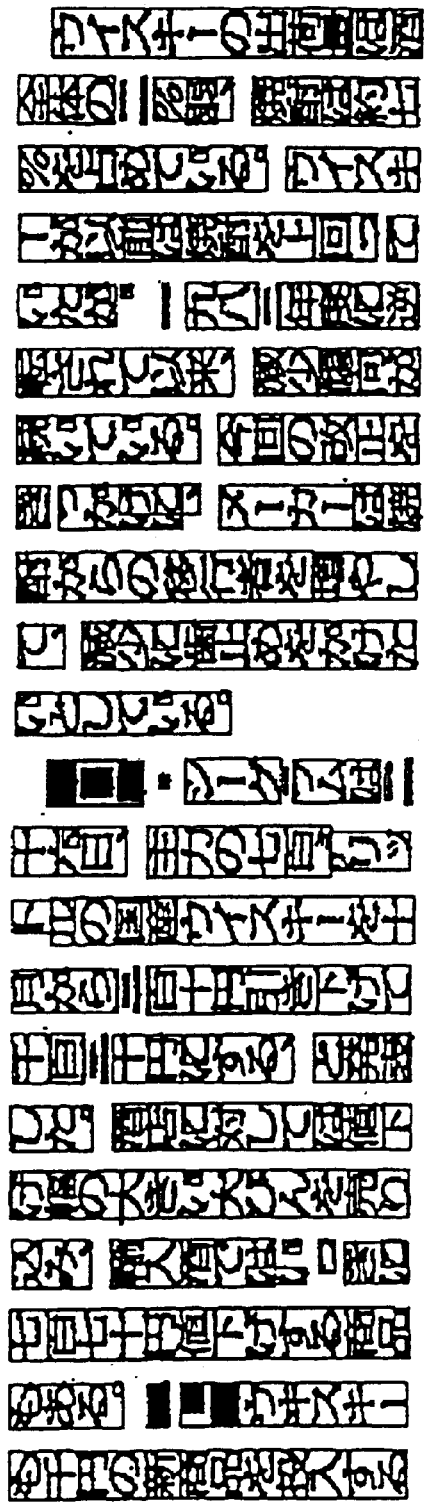
FIG. 15

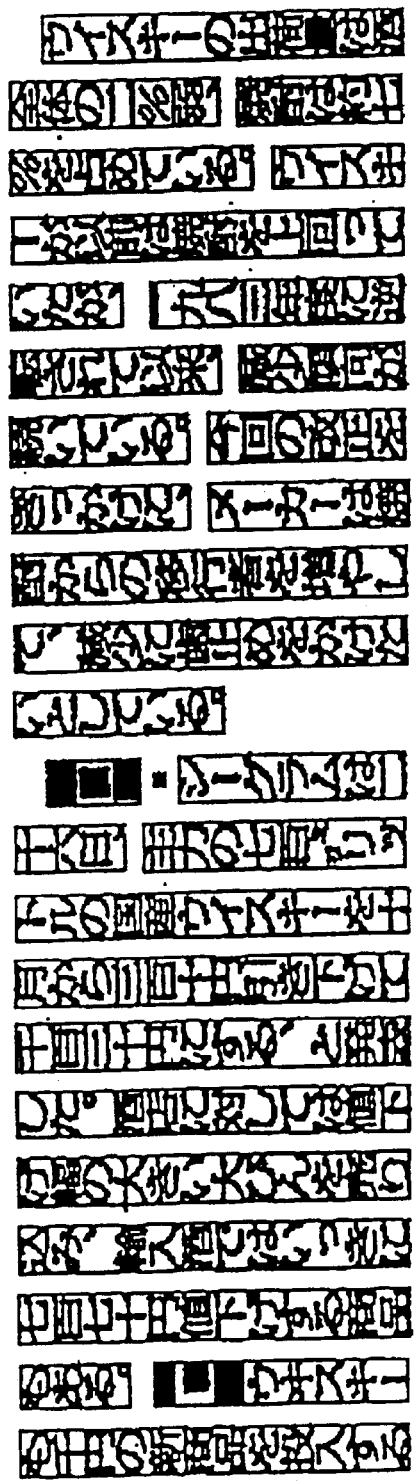
FIG. 19

AT FIRST COLUMN INTEGRATION IN LINE DIRECTION

|  | SMALL COLUMN | MEDIUM COLUMN | LARGE COLUMN |
|---|---|---|---|
| SMALL COLUMN | 3.0 | 2.0 | 1.0 |
| MEDIUM COLUMN | 2.0 | 2.0 | 1.0 |
| LARGE COLUMN | 1.0 | 1.0 | 1.0 |

FIG. 21A

AT SECOND COLUMN INTEGRATION IN LINE DIRECTION

|  | SMALL COLUMN | MEDIUM COLUMN | LARGE COLUMN |
|---|---|---|---|
| SMALL COLUMN | 1.0 | 1.0 | 0.5 |
| MEDIUM COLUMN | 1.0 | 1.0 | 0.5 |
| LARGE COLUMN | 0.5 | 0.5 | 0.5 |

FIG. 21B

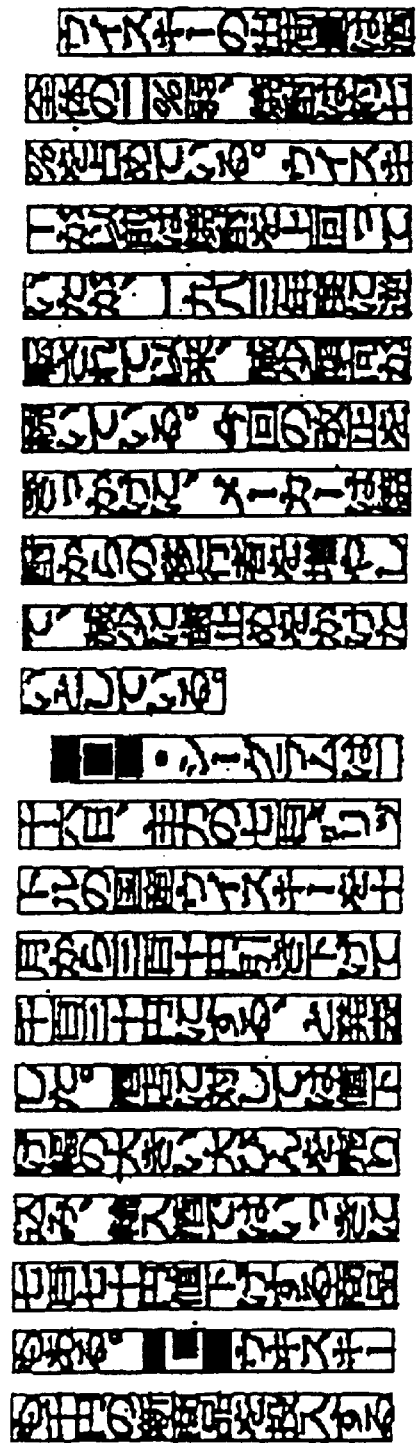
FIG. 23

DOCUMENT IMAGE RECOGNITION APPARATUS AND COMPUTER-READABLE STORAGE MEDIUM STORING DOCUMENT IMAGE RECOGNITION PROGRAM

BACKGROUND OF THE INVENTION

1. Field of the Invention

The present invention relates to a document image recognition apparatus and a computer-readable storage medium storing a document image recognition program for recognizing a document image by detecting the tilt of a document image in a document, etc. read by an image scanner or received from a facsimile device, amending the tilt, and extracting a character line and column.

To read a larger volume of document through an optical character reader (OCR) engine, it is necessary to provide the function of analyzing the layout of document text containing both vertical and horizontal character lines such as Japanese newspaper text. The present invention provides the new technologies of detecting the tilt of text for a correct tilt amendment to a document image and extracting lines and columns to correctly recognize document images as technologies required to analyze the layout of text having vertical and horizontal character lines.

2. Description of the Related Art (1) Detecting the tilt of a document image To read a common printed document, it is necessary to first obtain a document image using an image input device such as an image scanner, etc. At this time, a tilt is normally given to an original document in setting it. To use the document in electronic filing or document recognition, the tilt of the document image should be detected and amended.

In the conventional tilt detecting technology, it is assumed that characters are regularly arranged in a text area which forms an important part of a document image.

For example, the first system is suggested by the 'A Fast Algorithm for the Skew Normalization of Document Images' by Nakano, et al. in the publication D, vol. J69-D, No.11, pp.1833–1834 from the Transactions of the Institute of Electronics and Communication Engineers of Japan. That is, the tilt of a character string is estimated by assuming that the reference line of the character string is almost regularly provided, performing the Hough transformation on the coordinate value of the lower end of a character block, and detecting the peak value in the Hough space.

The second system is suggested by the 'Document Image Tilt Detection Apparatus' by Mizuno, et al. in Tokukaihei 7-192085. That is, the tilt of a character string is estimated by extracting the connected components of characters, generating a provisional character line by combining vicinal connected components, and obtaining a straight line touching the provisional character line.

The third system is suggested by the 'Document Tilt Amendment Apparatus' by Saito, et al. in Tokukaihei 2-170280. That is, a document image is provisionally amended by sequentially changing the tilt angle θ, and the angle θ for the smallest area of the enclosing rectangle containing all black pixels in the amended image is obtained.

(2) Layout Analysis (extracting lines and columns)

Conventionally, the following method has been suggested as a method of extracting lines and columns of character strings in a document image containing vertical and horizontal arrangements of characters.

For example, the fourth system is suggested by the 'Document Image Processing Apparatus' by Tsujimoto, et al. in Tokukaihei 1-183783. That is, the column of an input document can be automatically determined by projecting a character line of an input document in a specific direction, and generating a projective distribution.

Furthermore, the fifth system is suggested by the 'Document Image Processing Apparatus' by Mizutani, et al. in Tokukaihei 5-174179. That is, columns are extracted using an area in which no components are arranged in an input document.

The sixth system is suggested by the 'Character String Extracting Method and Apparatus' by Hiramoto, et al. in Tokukaihei 10-31716. That is, character lines are arranged in different directions, and extracted from a document containing areas having characters different in size and pitch.

For example, a number of Japanese printed documents have vertical and horizontal arrangements of characters. Therefore, it is necessary to appropriately extract character lines and columns when document text is recognized.

However, there are the following problems with the above described conventional systems.

(1) Problems in detecting the tilt of a document image

Since the lines are arranged in a fixed direction in the above described first system, the system cannot be applied to a document containing both horizontal and vertical character lines as in Japanese newspaper. Furthermore, since all characters are not arranged on a reference line even in a document having character lines in a fixed direction, error cannot be avoided. Additionally, there is another problem that the Hough transformation process requires a large volume of computation.

In the above described second system, there is the possibility that a large error may occur because, as in Japanese newspaper, a character line can be mistakenly extracted as a horizontal character line from the column having vertical character lines.

Although the above described third system is designed to detect the tilt of a document text containing both horizontal and vertical character lines, a tilt angle is detected according to small amount of information about the area of an enclosing rectangle containing black pixels of a document image. Therefore, there is the problem that the precision of a detected tilt is unstable. Furthermore, since it is necessary to repeatedly perform the process of extracting a rectangular area by rotating an image itself, a large volume of computation is required.

(2) Problem with layout analysis

Since the above described fourth system preliminarily extracts a character line, and performs a column extracting process based on the preliminary extraction, a non-uniform column which is divided into a number of small character line portions can be actually divided into small portions.

Since the fifth system extracts a column using a blank area, there is the possibility that a column can be mistakenly extracted when a document contains a space between lines larger than a space between columns.

This is a serious problem with a document image of the text formed by closely arranged vertical and horizontal character lines. For example,if a document image contains a small space between the vertically written article and the caption of the photograph as shown by a rectangular box below the photograph area at the upper left corner on the newspaper shown in FIG. 1, then the article and the caption are mistakenly recognized as one column and the characters in each line of the horizontally written caption are mistakenly recognized as the leading two characters of the vertically written article.

Since the column area is extracted as a preprocess performed before a very precise line extracting process in the sixth system, a non-uniform column which is divided into a number of small character line portions can be actually divided into small portions, thereby performing a wrong line extracting process.

That is, in the above described technology, either 1 (basic element set)→line extracting process→column extracting process→(layout analysis result) or 2 (basic element set) →column extracting process→line extracting process→ (layout analysis result) is followed and based on the bottom-up process or the top-town process. In the above described technologies, it is assumed that the line extracting process and the column extracting process are independent of other processes, and lines and columns are extracted by sequentially performing the processes, thereby causing the problems with these technologies.

SUMMARY OF THE INVENTION

Based on the above described background, the present invention has been developed to provide a document image recognition apparatus capable of detecting the tilt of a document containing both horizontal and vertical character lines at a high speed and with high precision, and extracting lines and columns with high precision even if a document image having a complicated structure with both horizontal and vertical character lines is to be recognized.

One of the embodiments of the present invention is an apparatus for recognizing a document image stored as electronic data by amending the tilt of the document image. The apparatus includes a character element extraction unit for referring to a document image stored as electronic data and extracting a set of elements forming characters from the document image; a line candidate extraction unit for referring to the extracted set of character elements and extracting candidates for horizontal character lines and vertical character lines from the set of character elements; a line reliability estimation unit for estimating the reliability of an extracted candidate; a line extraction unit for extracting a set of probable lines based on the estimated reliability; and a tilt estimation unit for estimating the tilt of the document image based on the arrangement of the character elements contained in the extracted set of probable lines.

According to the present embodiment, using a set of character elements extracted from the character element extraction unit, a line candidate is extracted, the reliability of the line candidate is estimated, a probable line is extracted according to the reliability, and then the tilt of the document image is estimated. That is, according to the present embodiment, a document image is not processed, that is, rotated, etc. to detect the tilt of the document image. As a result, the amount of computation can be considerably reduced. Furthermore, according to the present embodiment, since the line candidate extracting unit extracts candidates in the horizontal and the vertical directions, and the line reliability estimation unit and the line extraction unit extract a set of probable horizontal and vertical character lines. Therefore, according to the present embodiment, the tilt of a document containing both horizontal and vertical character lines can be detected and amended. Furthermore, since the tilt estimation unit estimates the tilt using only the character elements forming probable lines, the tilt can be estimated with high precision and resistance to noise.

Another embodiment of the present invention is an apparatus for recognizing a document image by analyzing the layout of a document indicated by a document image which is stored as electronic data and is to be recognized. The apparatus includes a basic line extraction unit for extracting a set of lines in a fixed direction from a set of basic elements forming the document image stored as electronic data; and a line/column reciprocal extraction unit for extracting a line and a column by reciprocally extracting a column based on the association between lines and extracting a line based on the restrictions by the extracted column.

The feature of this embodiment of the present invention resides in that the extraction of lines is correlated to the extraction of columns, that is, a line extraction result is reflected in a column extracting process while a column extraction result is reflected in a line extracting process. Based on this feature, lines and columns can be extracted with high precision from a document image having a complicated structure in which horizontal and vertical character lines are contained in a mixed manner, a non-uniform column containing small divided character line portions exists, a space between columns is smaller than a space between lines, etc.

BRIEF DESCRIPTION OF THE DRAWINGS

The present invention will be more apparent from the following detailed description, when taken in conjunction with the accompanying drawings, in which:

FIG. 2 shows an example of a basic configuration according to the present invention;

FIG. 3 shows an example of a hardware configuration according to the present invention;

FIG. 4 shows an example of a basic configuration of the document image tilt detection unit according to the present invention;

FIGS. 9A, 9B, 9C, 9D, and 9E show the estimation of the reliability of a line;

FIG. 10 shows an example of a basic configuration of the layout analysis unit according to the present invention;

FIG. 13 shows an example of a set of basic character elements;

FIG. 14 shows an example of a document image of an enclosing rectangle for horizontal character line elements;

FIG. 15 shows an example of a document image of an enclosing rectangle for horizontal character line elements;

FIG. 16 shows an example of a document image containing selected reliable character line elements represented by enclosing rectangles;

FIGS. 18A, 18B, 18C, 18D, 18E, and 18F show the line element matching process;

FIG. 19 shows an example of a result extracted by the basic line extraction unit;

FIGS. 21A and 21B show examples of the factor k for a variable ratio of a vicinity determination distance to a standard size;

FIG. 23 shows an example of a line element of a result extracted by the line/column reciprocal extraction unit;

DESCRIPTION OF THE PREFERRED EMBODIMENTS

Figure 1:
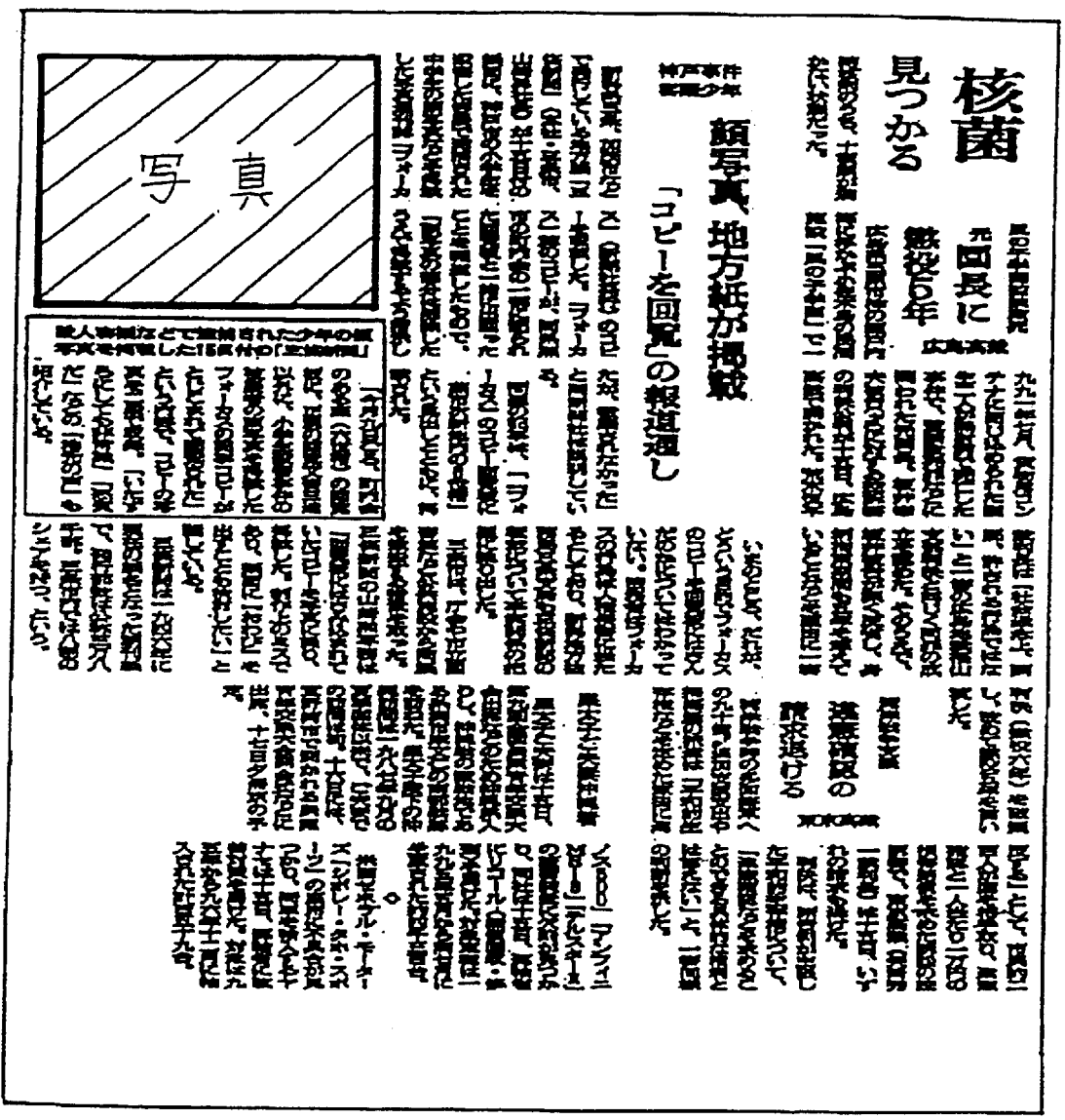
FIG. 1 shows an example of Japanese newspaper.

FIG. 2 shows an example of a basic configuration according to the present invention.

When a document image 2, which may contain both vertical and horizontal character lines and is to be recognized, is input to a document image recognition apparatus 100, a document image tilt detection unit 1 first detects a tilt angle 3 for tilt amendment. A layout analysis unit 5 extracts a basic line from a basic element set 4 extracted from a document image amended by the tilt angle 3. Then, the column structure of the document image 2 containing both vertical and horizontal character lines is recognized by repeatedly extracting lines and columns reciprocally, thereby outputting a layout analysis result 6.

(1) Detecting a tilt of a document image

The document image tilt detection unit 1 comprises a character element extraction unit for extracting a set of elements forming a character by referring to the document image 2; a line candidate extraction unit for extracting candidates for horizontal and vertical character lines by referring to a set of character elements; a line reliability estimation unit for estimating the reliability of each candidate for a line; a line extraction unit for extracting a set of probable lines based on the reliability of the lines; and a tilt estimation unit for estimating the tilt based on the arrangement of the character elements of a set of probable lines.

The amount of computation can be considerably reduced because character elements are extracted by the character element extraction unit, the subsequent processes are performed using a set of the extracted character elements, and images are not directly processed by rotating a document image, etc. Since the line candidate extraction unit extracts candidates for horizontal and vertical character lines and the line reliability estimation unit and the line extraction unit extract a set of probable horizontal and vertical character lines, the document image tilt detection unit 1 can detect the tilt of a document containing both vertical and horizontal character lines. Furthermore, since the tilt estimation unit estimates the tilt based on only the character elements forming probable lines, the estimation can be performed with high precision and resistance to noise.

(2) Analyzing a layout (extracting lines and columns)

The layout analysis unit 5 comprises a basic line extraction unit for extracting a set of lines in a fixed direction from the basic element set; a line/column reciprocal extraction unit for extracting lines and columns by reciprocally performing a column extracting process based on association between lines and a line extracting process based on the restrictions of the columns. An input basic element set can be connected components of black pixels in a document image or overlapping rectangles enclosing connected components of black pixels in a document image.

An outstanding difference between the present invention and the above described prior art technologies is that the present invention correlates the extraction of lines to the extraction of columns, that is, a result of a line extracting process is reflected in a column extracting process and a result of a column extracting process is reflected in a line extracting process whereas the prior art technologies perform the line extracting process and the column extracting process independently of each other, that is, the column extracting process is performed after the line extracting process and vice versa.

According to the present invention, the results of the line extracting process and the column extracting process are reciprocally improved based on the lines in a fixed direction. Thus, a high-precision line and column extracting process which has never been performed by the above described conventional technologies can be performed even on a document image having a non-uniform column which is divided into a number of small character line portions, and having a complicated document structure in which a space between lines is narrower than a space between columns.

A program for realizing each of the above described processing units in a computer can be stored in a storage medium such as a computer-readable portable memory, semiconductor memory, a hard disk, etc. The portable memory can be a CD-ROM, a DVD-ROM, a floppy disk, a magneto-optic disk, etc. When a program stored in such a storage medium is read by a computer, it is executed by the central processing unit of the computer, thus realizing the function of each processing unit.

The embodiments of the present invention are described below in detail by referring to the attached drawings.

[1] Hardware configuration

FIG. 3 shows an example of the hardware configuration to which the present invention is applied. The document image recognition apparatus 100 shown in FIG. 2 comprises as hardware, for example, a CPU 20, memory 21, an input device 22 such as a keyboard, etc., an output device 23 such as a display, etc., an external storage device 24 such as a hard disk, a storage medium reading device which reads the storage medium, etc., an image scanner 25 for reading an image, a bus 26 for connecting the above described units, etc. The function of each of the processing units shown in FIG. 2 is realized by the CPU 20 executing a program stored in the memory 21 or the external storage device 24 shown in FIG. 3.

[2] Domestic image tilt detection unit

FIG. 4 shows an example of a basic configuration of the document image tilt detection unit 1 according to the present invention. The document image tilt detection unit 1 according to the present invention receives the document image 2, detects the tilt of the image, and outputs the tilt angle 3. The document image tilt detection unit 1 comprises a character element extraction unit 11, a line candidate extraction unit 12, a line reliability estimation unit 13, a line extraction unit 14, and a tilt estimation unit 15.

Figure 5:
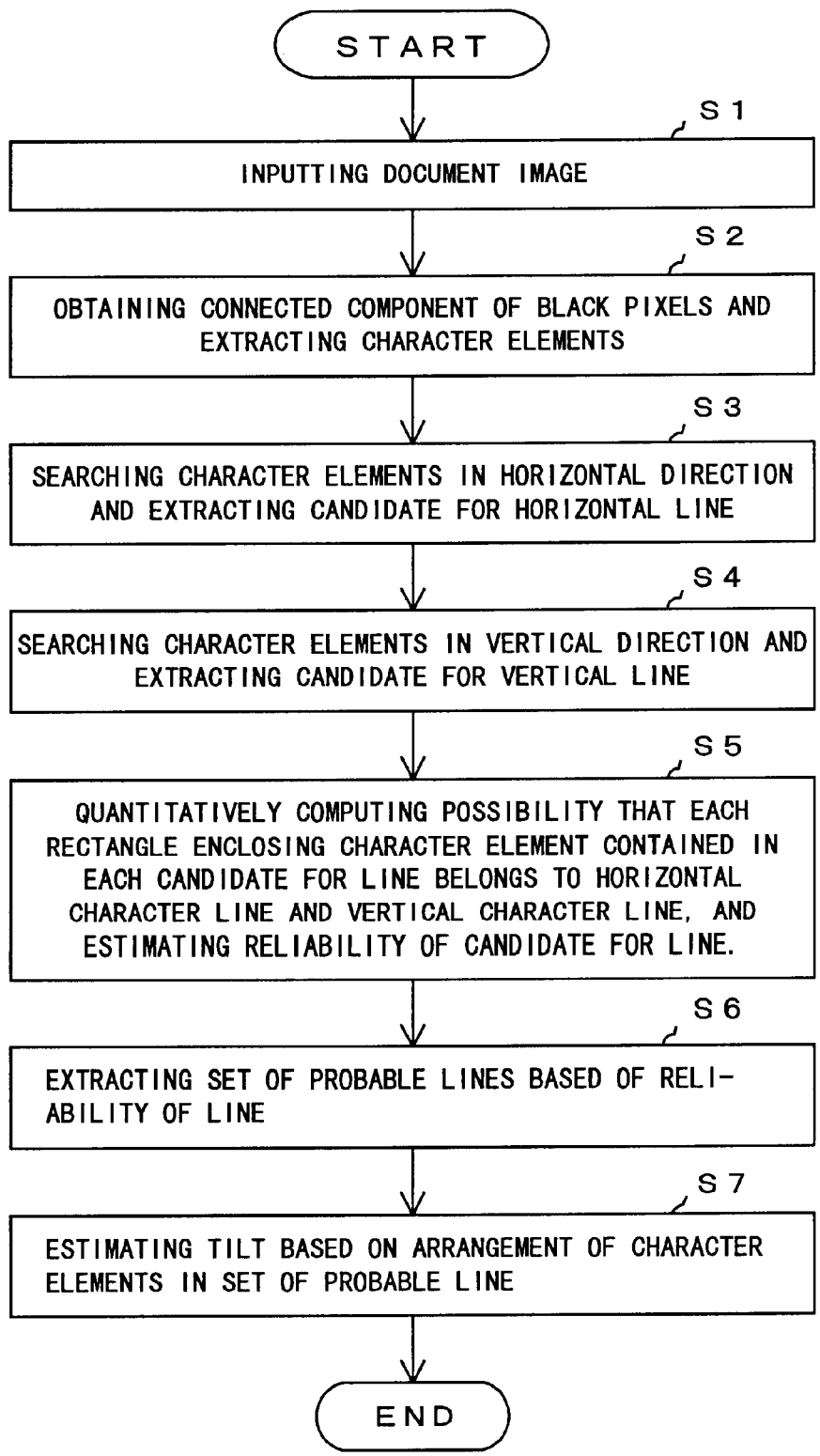
FIG. 5 is a flowchart of the process performed by the document image tilt detection unit.
Figure 6A:
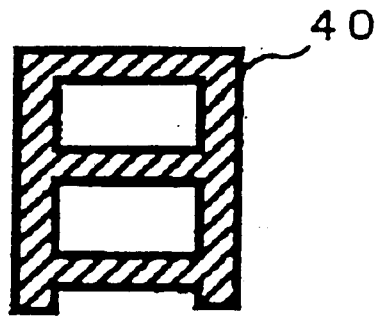
FIGS. 6A, 6B, and 6C show the extraction of character elements.
Figure 6B:
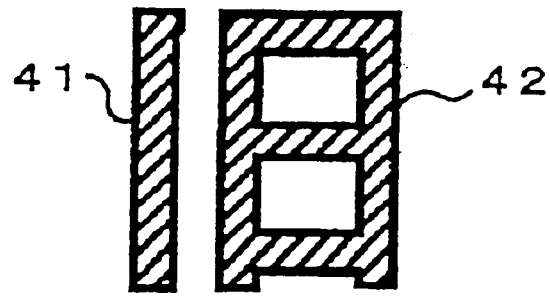
Figure 6C:
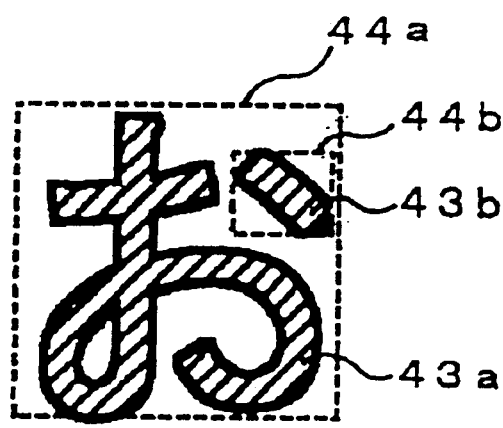
Figure 7:
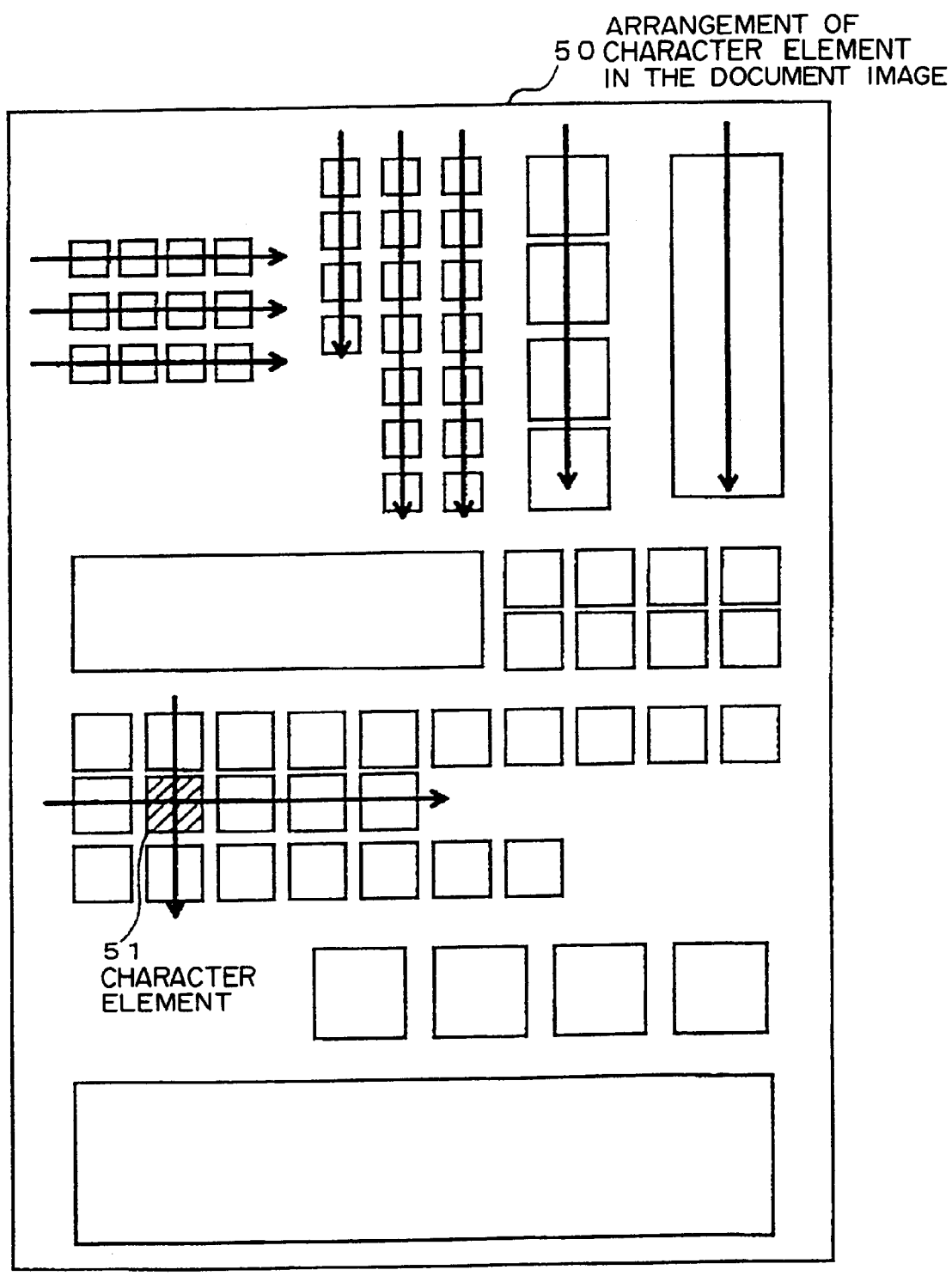
FIG. 7 shows the extraction of a line candidate.
Figure 8A:
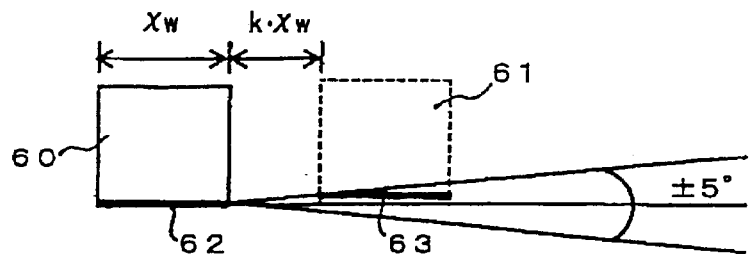
FIGS. 8A and 8B show the extraction of a line candidate.
Figure 8B:
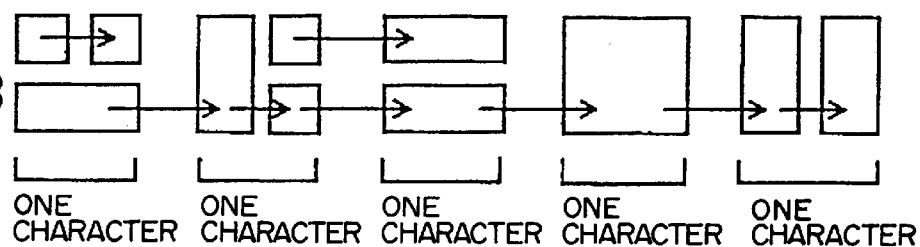

FIG. 5 is a flowchart of the process performed by the document image tilt detection unit 1. FIGS. 6A, 6B, and 6C show the extraction of character elements. FIGS. 7, 8A, and 8B show the extraction of candidates for lines. FIGS. 9A, 9B, 9C, 9D, and 9E show the estimation of the reliability of a line.

The process performed by the document image tilt detection unit 1 is described in detail by referring to the flowchart shown in FIG. 5. First, when the document image 2 is input in step S1 shown in FIG. 5, the character element extraction unit 11 refers to the document image 2, and extracts a set of character elements. In this process, it obtains a set of the connected component of the black picture elements in the document image 2 through a labelling method, etc., and extracts character elements (step S2). At this time, the rectangle enclosing each connected component is obtained, and only the coordinates of the enclosing rectangle is used in the subsequent processes, thereby reducing the amount of computation.

Overlapping rectangles enclosing connected components are integrated into each other. This process is referred to as an overlapping rectangle integrating process. A set of overlapping rectangles is obtained as a result of the overlapping rectangle integrating process. Next, an excessively large overlapping rectangle corresponding to an area of a figure, a table, etc. is removed by obtaining a histogram showing the ratio of an overlapping rectangle to the size of a set, etc. Thus, a set of rectangles enclosing corresponding character elements is output.

As shown in FIG. 6A, for example, the character "日" is output by extracting one connected component 40 of black pixels as one character element. As shown in FIG. 6B, the character "旧" is formed by two connected components 41 and 42 of black pixels. Therefore, the character is extracted as two character elements. As shown in FIG. 6C, the character "ぁ" is formed by two connected components 43a and 43b of black pixels. However, when enclosing rectangles 44a and 44b are individually obtained, they are actually overlapping rectangles. Therefore, the two connected components 43a and 43b are extracted as a single character element by performing the overlapping rectangle integrating process.

In the example shown in FIG. 6C, two connected components are extracted as one character element in a single overlapping rectangle integrating process. When there are a number of connected components, the overlapping rectangle integrating process is performed for plural times.

The line candidate extraction unit 12 refers to, for example, a set of character elements shown in the example of the character element arrangement 50 in a document image shown in FIG. 7, and extracts a set of candidates for horizontal and vertical character lines (steps S3 and S4). At this time, one character element may belong to two candidates for a horizontal character line and a vertical character line.

The line candidate extraction unit 12 practically outputs a candidate for a set of horizontal and vertical character lines from the vicinal relationship of the rectangles enclosing character elements. A candidate for a horizontal character line is extracted by sequentially checking whether or not the lower side of the rectangle enclosing character elements exists within a predetermined range in the horizontal direction in consideration that the lower side of the enclosing rectangle is printed along the reference line relating to a part of the character elements contained in a horizontal character line.

Described below is the process of searching for character elements in the horizontal direction adjacent to a rectangle 60 enclosing the character elements shown in FIG. 8A. Relating to a lower side 62 of the rectangle 60 enclosing the character elements, it is checked whether or not a lower side 63 of a rectangle 61 enclosing the adjacent character elements exists within a range of a predetermined angle (for example ±5°) from the right end of the lower side 62 to right, and within a range of a distance k·Xw (where k indicates a predetermined value, and Xw indicates the width of an enclosing rectangle in the X direction). If the lower side 63 of the rectangle 61 enclosing the character elements exists within the above described ranges, then a right link is established from the rectangle 60 to the enclosing rectangle 61. The searching process is repeated on each enclosing rectangle. No right link or only one right link can be established from each enclosing rectangle, and a right link cannot be branched from one enclosing rectangle. As a result, for example, a groups of enclosing rectangles having right links in the horizontal direction can be obtained as shown in FIG. 8B. Therefore, a set of candidates for horizontal character lines can be extracted by tracing the right links.

Similarly, candidates for vertical character lines can be obtained by tracing downward links established from the left side of the rectangle enclosing each character element toward the character elements below the enclosing rectangle.

The line reliability estimation unit 13 estimates the reliability of each candidate for a character line (step S5). First, the probability of a line is quantitatively computed for each candidate for a line. For example, the probability of a line can be quantitatively obtained from the quantity represented by the length of a line containing the number, equal to or larger than a predetermined value, of character elements contained in a candidate for a line; the quantity represented by the adjacency indicating the closeness between character elements; and the quantity represented by the similarity in size and interval of character elements.

Each rectangle enclosing character elements can be a candidate for both a horizontal character line and a vertical character line. In this case, the probability of a horizontal character line is compared with the probability of a vertical character line. The direction of a more probable line is determined and the direction flag of the corresponding character elements is set to 'horizontal' or 'vertical'. This is the character direction of the character elements. Then, the ratio of the character elements having the character direction matching the direction of the candidate for the line to each candidate for a line is obtained. The result is referred to as the reliability of the candidate for the line.

For example, as shown in FIGS. 9A, 9B, 9C, and 9D, each character element contains a character element 70 having no adjacent character elements, a character element 71 contained only in a candidate for a vertical character line, a character element 72 contained only in a candidate for a horizontal character line, a character element 73 contained in both vertical and horizontal character lines, etc. For each of these character elements, the probability of a character line is quantitatively computed using the scale of the above described probability of a character line, and a horizontal or a vertical direction flag is set. Not only a simple flag, but also a probability value such as vertical 0.5, horizontal 0.5, etc. can be added for an uncertain flag. As a result, a direction matching rate is computed, and the result is defined as a value of line probability. For example, the line reliability of a horizontal character line can be obtained by computing the ratio of the character elements for which a horizontal direction flag is set to a candidate for the current horizontal character line.

The line extraction unit 14 extracts a set of probable lines based on the reliability of a line (step S6). In this example, a candidate for a line having the reliability of a line higher than a predetermined value is output as a line.

The tilt estimation unit 15 estimates the tilt based on the arrangement of character elements of a set of probable lines (step S7). Since horizontal character lines of vertical character lines in the same document image indicate the same tilt, the tilt is estimated by the least squares method by substituting plural straight lines based on the coordinates of the reference side (a lower side for a horizontal character line, and a left side for a vertical character line) of a rectangle enclosing character elements belonging to a set of probable lines. The least squares method is used so that the weight of each data to an estimation value can be commonly used.

When the above described document image tilt detection unit 1 is used, the tilt can be precisely detected at a high speed even for a document containing both vertical and horizontal character lines. An amendment is made to the tilt of the document image 2 based on the detected tilt angle 3, and control is passed to the layout analyzing process in the next step.

[3] Layout analysis unit

FIG. 10 shows an example of a basic configuration of the layout analysis unit 5 according to the present invention. The layout analysis unit 5 in the document image recognition apparatus 100 according to the present invention receives the basic element set 4 of an amended document image, and outputs the layout analysis result 6 after performing the line extracting process and the column extracting process. Therefore, the layout analysis unit 5 comprises a basic line extraction unit 8 and a line/column reciprocal extraction unit 9.

The basic line extraction unit 8 comprises a line element generation unit 81 for generating a line element having the horizontal and vertical line directions based on the correlation among a basic element set; a line element selection unit 82 for estimating the reliability of each line element and selecting line elements based on the reliability; and a line element matching unit 83 for obtaining a consistent line set and a consistent character set. The line/column reciprocal extraction unit 9 comprises a column element integration unit 91 for integrating correlated columns; a column element matching unit 92 for obtaining a consistent set of columns and a consistent set of lines; and a line element matching unit 93 for obtaining a consistent set of lines and a consistent set of characters.

(1) Basic line extraction unit

Figure 11:
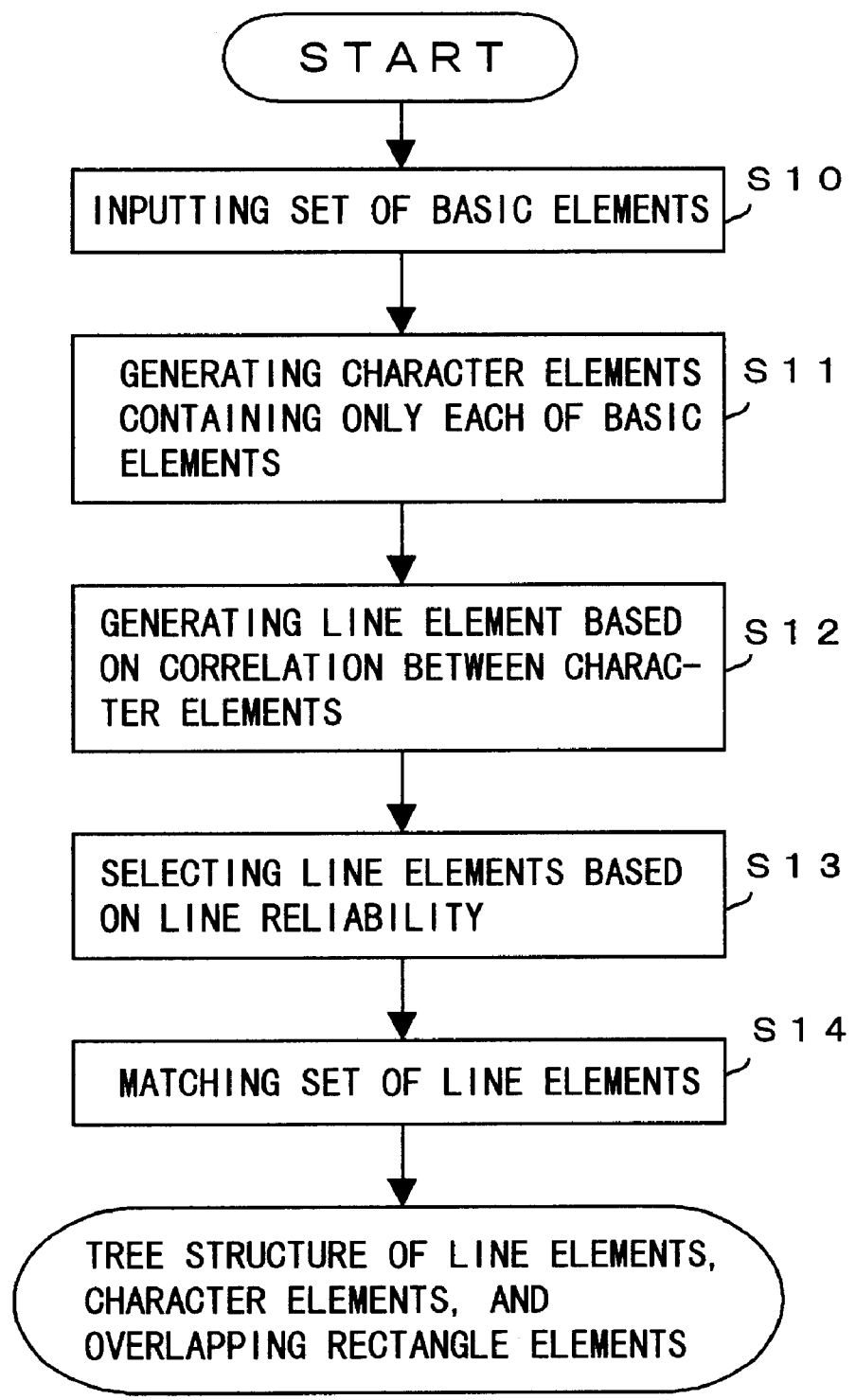
FIG. 11 shows the outline of the process performed by the basic line extraction unit.

FIG. 11 shows the outline of a process performed by the basic line extraction unit 8.

The input of the basic line extraction unit 8 is the basic element set 4 forming a document such as connected component of black pixels in a document image, overlapping rectangles enclosing connected components of black pixels in a document image, etc. The output of the basic line extraction unit 8 is a set of tree structure containing line elements, character elements, and basic elements correlated to each other through inclusive relationship.

When the basic element set 4 is input in step S10, the line element generation unit 81 generates a character element containing only each of the basic elements (step S11), and then generates a line element by correlating character elements (step S12). Practically, the line element generation unit 81 generates a line element having both horizontal and vertical character line directions. The correlation between the basic element sets is set based on the adjacency or the similarity, that is, a state in which elements are closely arranged, the elements are equal to each other in size or interval in arrangement, etc.

Next, the line element selection unit 82 estimates the reliability of each line element, and selects line elements based on the reliability (step S13).

Furthermore, the line element matching unit 83 performs a matching process on a line element set to obtain a consistent set of lines and a consistent set of characters based on the basic element sets (step S14), and outputs a set of tree structure containing line elements, character elements, and basic elements (overlapping rectangle elements) correlated to each other through inclusive relationship. Practically, a line element set and the internal structure of line elements satisfying the following conditions are obtained.

1) All character elements belong to only one line element.

2) The line area of each line element does not overlap the line area of another line element. A line area refers to an area defined by a rectangle enclosing the character element belonging to each line element.

3) The character element belonging to a line element having a fixed line direction is assigned an order in the line direction, and integrated into each other such that no character elements overlap each other in the direction perpendicular to the line direction. The line extracting process performed by the basic line extraction unit 8 is described below further in detail by referring to a practical example.

Figure 12:
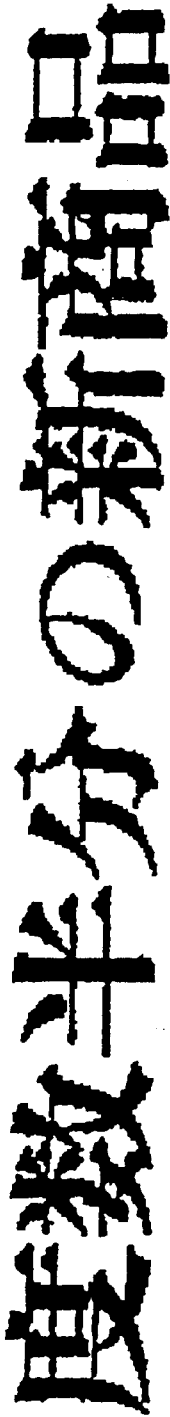
FIG. 12 shows an example of a document image to be processed.

It is assumed that a line/column extracting process is performed on the document image as shown in FIG. 12. After extracting connected component of black pixels from the document image shown in FIG. 12 through a labelling process, and after integrating overlapping rectangles, a set of overlapping rectangles is extracted as a set of basic elements and then input (step S10 in FIG. 11). A set of character elements having each of the input sets of overlapping rectangles as a subset is generated and defined as a set of basic character elements (step S11).

FIG. 13 shows an example of a set of basic character elements of a document image generated as described above. Each rectangle shown in FIG. 13 indicates a character element.

Next, a line element is generated by correlating character elements (for example, adjacency) (step S12). In this example, a link is established by searching for the closest character element to and at a distance, in the horizontal and vertical directions, obtained by multiplying the size of the character element by a value equal to or smaller than a threshold from each character element of a set of input basic character elements. Thus, a row of the closest character elements in the horizontal and vertical directions is generated as a line element. A line element can have the horizontal line direction (horizontal line element) or the vertical line direction (vertical line element). A number of character elements can be subsets of both horizontal line elements and vertical line elements, thereby causing interference between elements frequently.

FIG. 14 shows an example of a document image indicating a rectangle enclosing horizontal line elements generated by the adjacency of character elements. FIG. 15 shows an example of a document image indicating a rectangle enclosing vertical line elements generated by the adjacency of character elements.

A document image having the tilt of 0 can be assumed through the tilt amending process performed as a preprocess by the document image tilt detection unit 1. Therefore, in this example, extension by a tilt is not allowed in the adjacency conditions. The threshold of the distance in the adjacency conditions is a value smaller than the value in the tilt matching process after detecting a tilt so that a line probably belonging to a different column cannot be integrated.

Then, a line element is selected based on the line reliability (step S13). The process is performed in the same method as the process performed by the document image tilt detection unit 1. First, the line reliability of the generated line elements is quantified based on the quantity by the length of a line, the quantity by the adjacency, the quantity by the similarity, etc. That is, the line reliability is computed based on an average interval of contained character elements, the number of contained character elements, the length to width ratio of a line area represented by a rectangle enclosing all contained character elements, etc. Next, the direction of each character element is defines as the direction of a related line element. When there are two types of line elements, that is, the horizontal character line element and the vertical character line element as line elements relating to character elements, the direction of a line element having higher line reliability is defined as the direction of character elements. Furthermore, the ratio of the character elements having the same direction as the line direction of line elements to the character elements contained the line elements is defined as the level of the reliability of the generated line elements. The line elements at a level lower than a predetermined threshold is deleted, and line elements at a level higher than a predetermined threshold are selected as basic line elements with high reliability.

Figure 16:
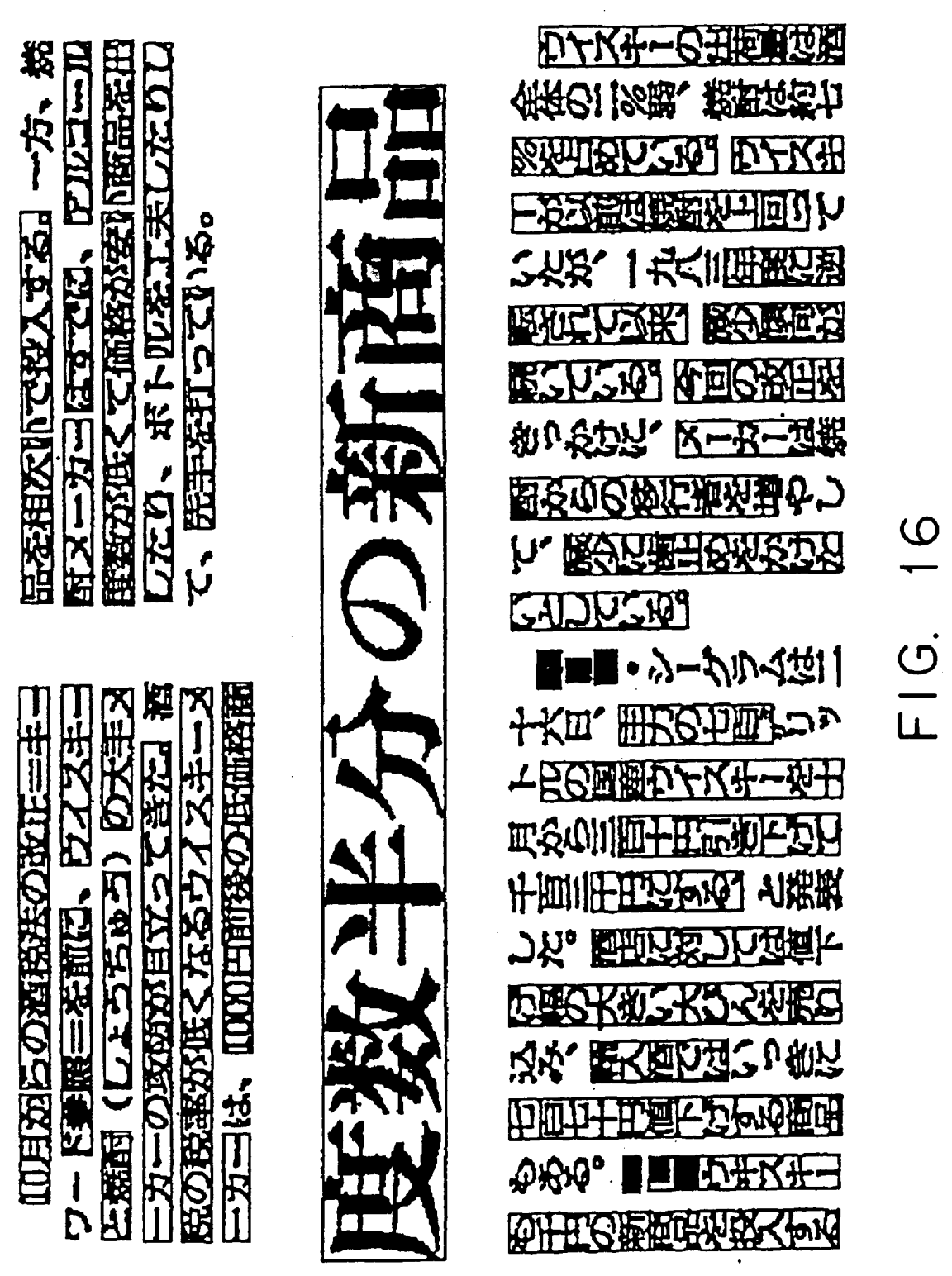

FIG. 16 shows an example of a document image of selected basic line elements with high reliability displayed with an enclosing rectangle. In FIG. 16, a part of original horizontal and vertical character lines have been selected as line elements having the correct line directions, and lines belonging to different columns have not been mistakenly integrated.

Figure 17:
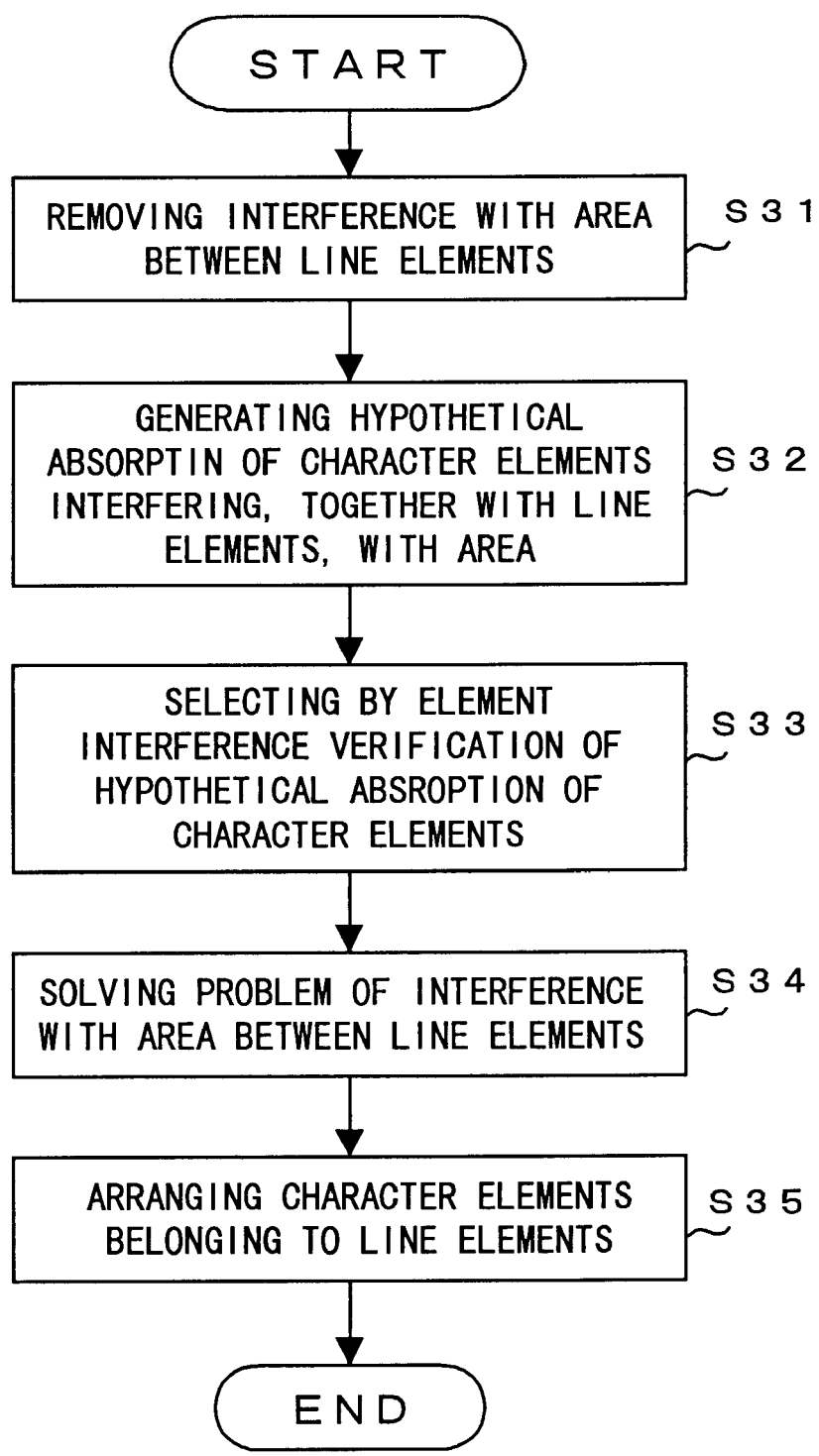
FIG. 17 is a flowchart showing the process performed by the line element matching unit.

Next, the line element matching unit 83 performs the matching process (step S14) on a set of line elements. FIG. 17 is a flowchart of the process performed by the line element matching unit 83.

First, the area interference between line elements is removed (step S31). Rectangles enclosing line elements may touch each other. A rectangle enclosing line elements refers to the minimum rectangle including the rectangles enclosing character elements contained in the line elements. When rectangles enclosing line elements touch each other, it is assumed that the interference between line elements has arisen, and the interference is removed in step S31.

Then, the hypothetical absorption of character elements which, together with line elements, interfere with an area is set (step S32). There is the possibility that a character element touches the rectangle enclosing a line element, but does not belong to a subset of a line element. Such a character element is searched for in each line element, and is absorbed as a subset. In this case, a line element having a character element absorbed as a subset is referred to as the hypothetical absorption.

Next, elements are selected by verifying the interference with elements in the hypothetical absorption of character elements (step S33). In the above described process in step S32, there is a strong possibility that the character elements touching a plurality of line elements are noises. Since it may be desired that such character elements are deleted without being defined as subsets of line elements, the verification is made in step S33.

Then, the problem of the interference with an area between line elements is solved (step S34). If a character element which becomes a new subset of a line element as a result of the above described processes in steps S32 and S33 exists, then the rectangle enclosing line elements can be extended. Therefore, in this case, the processes in steps S31 through S33 are repeated on the line elements.

Furthermore, character elements belonging to line elements are arranged (step S35). If all character elements contained in the rectangle enclosing line elements are set as subsets, then it is desired that character elements overlapping in the direction perpendicular to the line direction are grouped, and a possible candidate for a character segmented during the text recognizing process is limited. At this time, a set of basic elements of overlapping rectangle element, which are grouped plural subsets of elements are integrated into a group and defined as a subset of new integrated character elements.

The above described line element set matching process is described below by referring to a one-line image as shown in FIGS. 18A through 18F.

The rectangle in the image shown in FIG. 18A indicates a probable basic vertical character line element of high reliability obtained as a result of the selection of line elements. The row of rectangles in the image shown in FIG. 18B refers to character elements which are subsets of vertical line elements shown in FIG. 18A. Since a link is established based on the left side of each rectangle enclosing character elements, the right character elements of '' ' カ ' ' and '' ' 増 ' ' in the image have not been defined as subsets of vertical line elements. Additionally, in FIG. 18B, there are two character elements not enclosed by rectangles enclosing line elements. They are character elements '' ' 中 ' ' and '' ' し ' '.

Then, the area interference between line elements of an image is removed, the hypothetical absorption of character elements which interfere with an area of line elements is set and selected, and then all character elements touching rectangles enclosing line elements are fetched as subsets. FIG. 18D shows the image obtained as a result of arranging the character elements belonging to line elements after removing the interference with an area between line elements. In FIG. 18D, the character elements overlapping each other when projected in the direction perpendicular to the line direction (the horizontal direction in the example shown in FIG. 18) are integrated into a group.

Next, adjacent character elements, which have not been integrated yet, are integrated into line elements. The result is shown in FIG. 18E. In FIG. 18E, all character elements are integrated into a single character line. The image in FIG. 18F shows a set of character elements which are subsets of integrated line elements.

FIG. 19 shows the result of performing the above described matching process on the sets of line elements. In this process, all character elements are defined as subsets of line elements, and a set of three structure containing line elements, character elements, and basic elements correlated by inclusive relationship is designed as an intermediate document structure.

As it is obvious according to the example shown in FIG. 19, the set of line elements obtained as a result of the above described line extracting technology contains a plurality of line elements closely arranged to each other in the line direction when a column is set. Thus, the line elements obtained in this step do not correspond to a complete line as components of a column. To form a complete line, a column extracting process is to be performed to further integrate the line elements belonging to the same column, that is, the line extracting process and the column extracting process should be reciprocally performed.

(2) Line/column reciprocal extraction unit

The line/column reciprocal extraction unit 9 integrates correlated columns, adjusts a set of column elements to obtain a consistent set of columns and a set of lines, and adjusts a set of line elements to obtain a consistent set of lines and a set of characters. Furthermore, the line/column reciprocal extraction unit 9 repeatedly integrates columns to make a line extraction result and a column extraction result affect each other, thereby obtaining a more precise result in the line/column extracting process.

Figure 20:
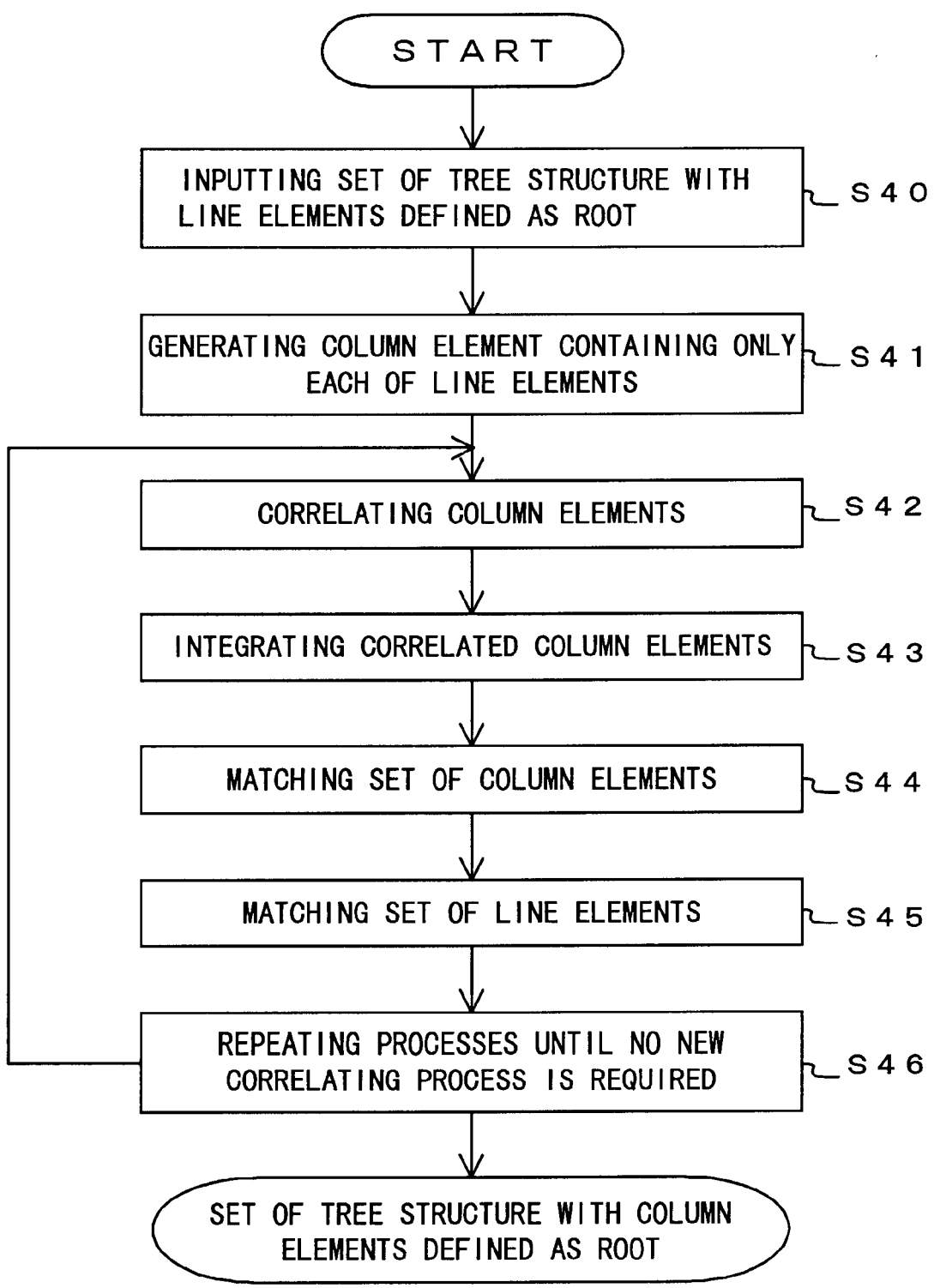
FIG. 20 shows the outline of the flow of the process performed by the line/column extraction unit.

FIG. 20 shows an outline of the flow of the process performed by the line/column reciprocal extraction unit 9.

The input to the line/column reciprocal extraction unit 9 is a set of tree structure (line elements, character elements, and basic elements correlated by the inclusive relationship) with the line elements defined as a root, which are obtained from the basic line extraction unit 8. The output from the line/column reciprocal extraction unit 9 is a set of tree structure (column elements, line elements, character elements, and basic elements correlated by the inclusive relationship) with the column elements defined as a root.

When a set of three structure is input with line elements defined as a root (step S40), a column element containing only one line element is generated (step S41). Column elements are integrated by repeatedly performing the following steps S42 through S46. Correlating column elements (step S42) and integrating the correlated column elements (step S43) is performed basically in the same way as the process performed on a set of character elements and line elements to generate line elements by the basic line extraction unit 8. This process is performed on a set of line elements and column elements.

Performed next is a process of matching a set of column elements (step S44). The process of matching a set of column elements is performed to obtain the internal structure of a set of column elements and the column elements satisfying the following conditions.

1) Each line element belongs to only one of the column elements.
2) The column area of each column element does not overlap another column area. The column area is defined by a rectangle enclosing line elements belonging to respective column elements.
3) A line element belonging to the column element having a fixed column direction is ordered in the column direction, and integrated into other elements in such a way that it may not overlap another line element in the direction perpendicular to the column direction.

After performing the process of matching a set of column elements, the process of matching a set of line elements is performed again as described above by referring to the basic line extraction unit 8 (S45). Thus, a column extraction result is fed back to a line extraction result, thereby improving the precision in line and column extraction. The above described processes in step S42 through S45 are repeated until no new correlating processes is performed (step S46).

In the above described process, the correlation in the two-dimensional direction can be avoided by repeatedly correlating column elements in the line (contained in the column element) direction and in the direction perpendicular to the line direction, thereby reducing the amount of computation. Furthermore, the correlation between column elements can be dynamically determined by the internal structure of the column element to be correlated. Thus, a line/column extracting process can be performed corresponding to the structure of a document with high precision. For example, when a document contains a small number of big columns among well-arranged columns, a parameter can be fixed. However, when a document contains a number of small non-uniform columns each containing a small number of lines, or when a document is table formatted in which a space functions as a separator, a method of generating a hypothesis depending on the situation is more effective. There are the following three methods of correlating column elements depending on the situation.

1) Depending on the size (number of contained lines) of a column (or a rectangle enclosing a column) to be correlated, the ratio of the adjacency determination distance to the standard size is changed. As a result, large and stable columns are not excessively integrated into each other, thereby performing an appropriate integrating process between small divided columns or between a large column and a small column.
2) An adjacency determination distance is set in proportion to the size of a line contained in the column to be correlated. Therefore, an appropriate integrating process can be performed depending on the size of contained character elements. As a result, no integration between large columns, excessive integration between columns having a small number of lines, or excessive integration between columns having too different number of lines can be considerably reduced.
3) Depending on the progress of the column extending process, the ratio of the adjacency determination distance to the standard size is changed. The process of extending a column in the line direction is repeated two times. In the first process, the column is divided, and is to be integrated. In the second process, since considerably stable columns have been generated, it is necessary to control excessive integration. As a result, in the first process, the ratio to the standard size is set high for easier integration. In the second process, the ratio to the standard size is set low for control of integration.

Practically, the adjacency determination distance D is represented by kS, where S indicates the standard size adaptively determined in the process 2) above, and k indicates the factor determined by the processes 1) and 3) above.

To realize the above described processes 1) and 3), for example, the column integrating process is repeated four times in the perpendicular-to-line direction, the line direction, the perpendicular-to-line direction, and the line direction. If a factor k as shown in FIGS. 21A and 21B is used in the column integrating process performed in the line direction, a column can be extracted with high precision, thereby performing a line extracting process with high precision as a result of the process of adjusting a set of columns. In FIGS. 21A and 21B, a 'small column' refers to a column containing only one line, a 'medium column' refers to a column containing two lines and less than 101 characters, and a 'large column' refers to a column containing two lines and more than 100 characters, or containing three or more lines.

The process of correlating the sets of column elements can be performed based on the above described adjacency or similarity. Using the similarity, columns can be precisely separated even when the space between columns is narrower than the space between lines. The process can be also performed based on the position of a column (or a rectangle enclosing a column) in a document image.

Furthermore, the parameter, which is set for assigning an element correlation condition for use in correlating column element sets, is changed depending on the time of processes. As a result, lines and columns are integrated, and a flexible process can be performed by controlling excessive integration of columns in the later step of the integrating process, thereby performing a line/column extracting process with higher precision.

Additionally, when the basic line extraction unit 8 and the line/column reciprocal extraction unit 9 perform a process of matching line elements, they can be designed to compute and obtain the information about the attributes of a line such as the standard character width, length, interval, etc. from a set of character elements belonging to line elements. The obtained information is stored. According to the obtained information, the sets of column elements can be correlated. The information about the attributes of a line can be stored after being obtained from a line element belonging to a column element when the line/column reciprocal extraction unit 9 performs a process of matching column elements.

Figure 22:
FIG. 22 shows an example of a column element of a result extracted by the line/column reciprocal extraction unit.

FIG. 22 shows a result of the column extracting process performed on a document image. FIG. 23 shows the line element in the column obtained by the line/column reciprocal extraction unit 9. Thus, the lines belonging to the same column have complete line elements extracted as not overlapping each other in the projection in the line direction.

A result of the embodiment according to the present invention is described below by referring to FIGS. 24, 25, and 26.

Using a document image from a newspaper containing both vertical and horizontal character lines to be processed, a binarized document image is processed after reading 400 dpi from the newspaper. FIG. 24 shows a reduced document image. Although a picture is printed at the upper left portion, it is shown as blank because a picture is not a target to be recognized in this case.

Figure 24:
FIG. 24 shows an example of a document image for evaluation of an embodiment of the present invention.
Figure 25:
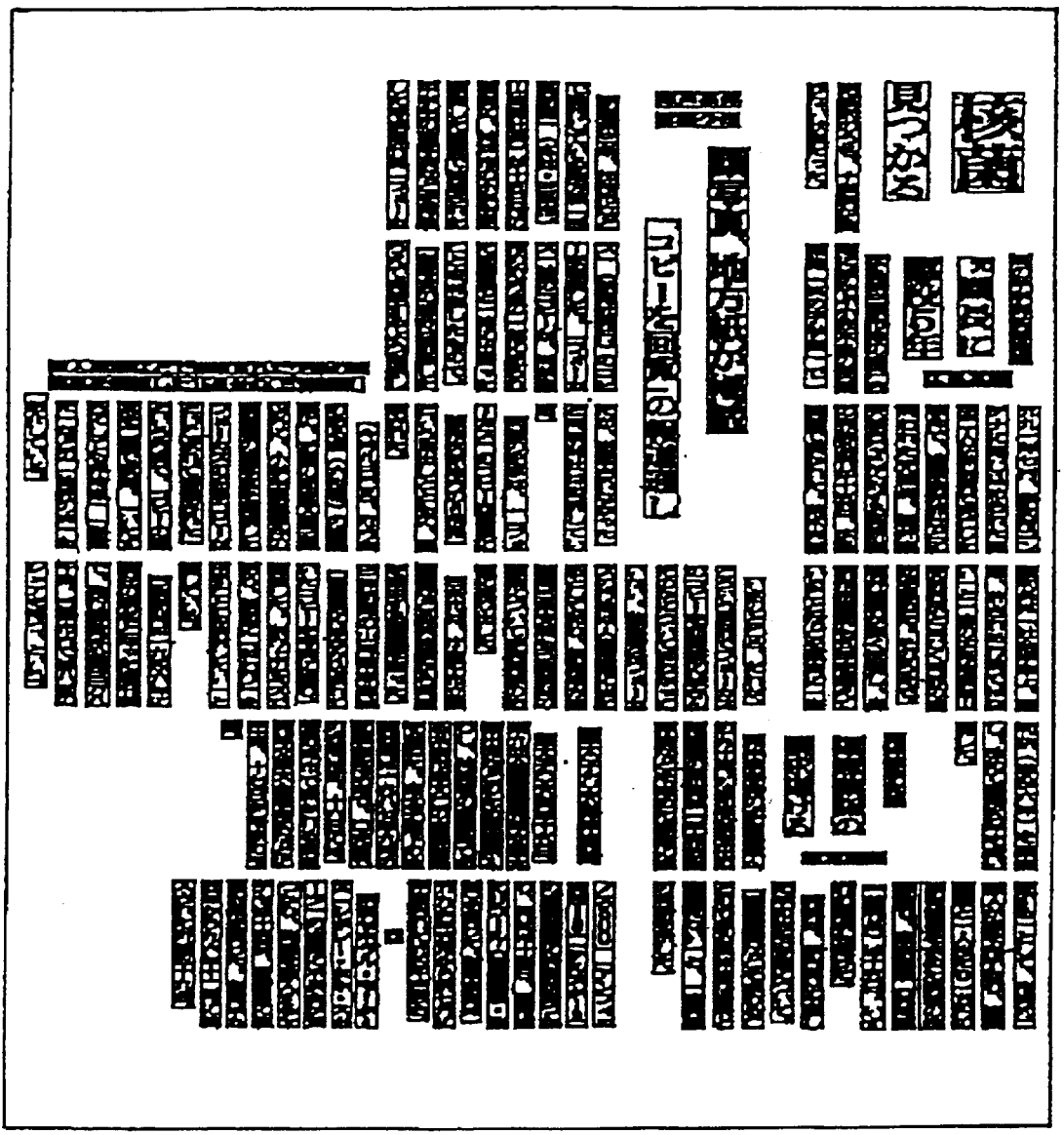
FIG. 25 shows a result of a line extracting process performed on the document image shown in FIG. 24.
Figure 26:
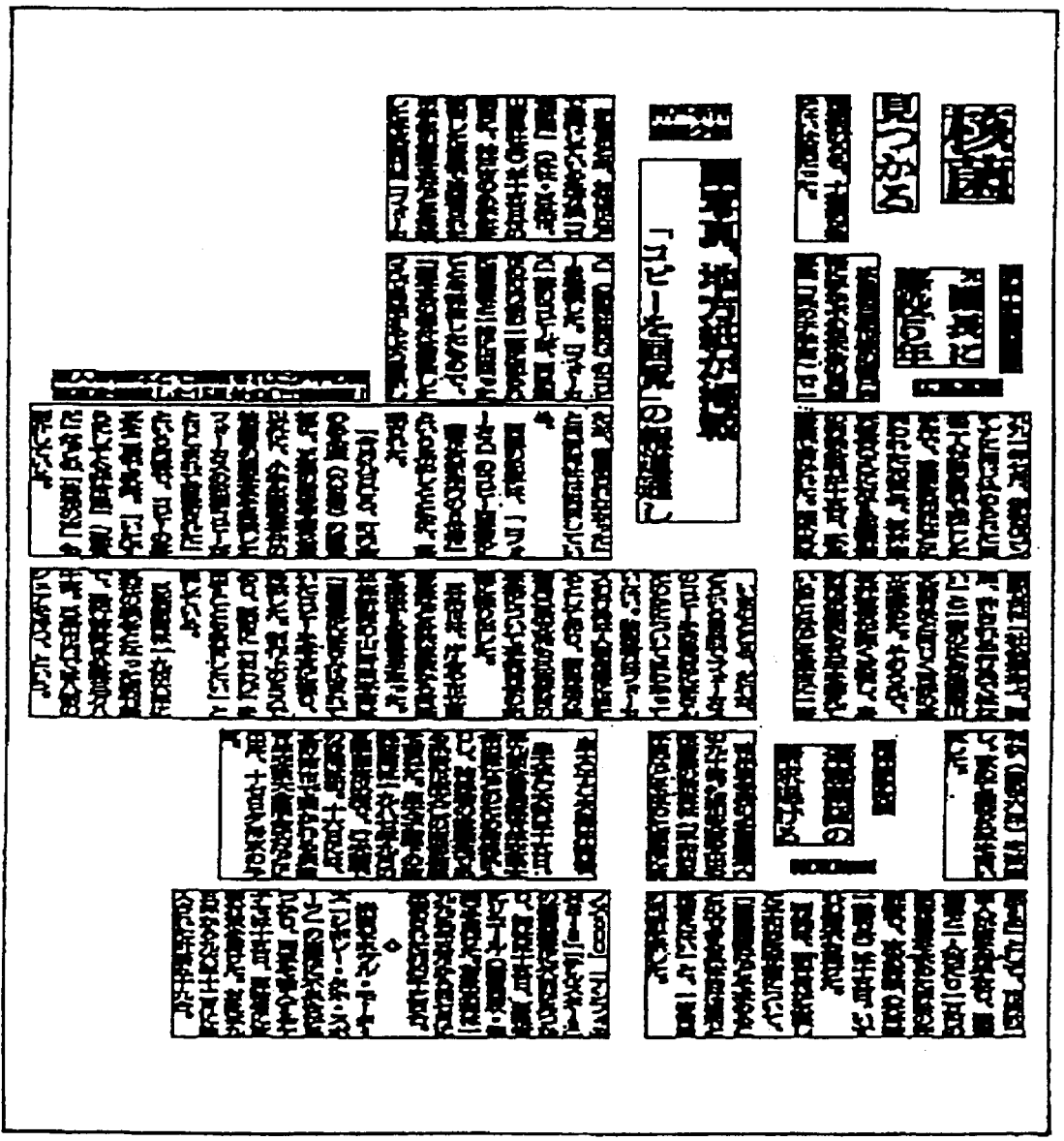
FIG. 26 shows a final result of a column extracting process performed on the document image shown in FIG. 24.

FIG. 25 shows an example of a result of the line extracting process performed on the document image shown in FIG. 24. The precision of the line extracting process on the document image is 100%. FIG. 26 shows an example of a result of the final column extracting process. The precision of the line extracting process on the document image is also 100%.

As described above, a tilt of a document image containing both vertical and horizontal character lines, which cannot be detected in the above described conventional technology, can be detected at a high speed with high precision according to the present invention. Additionally, character lines and columns of a document image having a complicated document structure including a non-uniform column which is divided into a number of small character line portions, and including the space between lines narrower than the space between columns can be extracted with high precision.

What is claimed is:

1. A method for detecting a tilt of a document image stored as electronic data, amending the tilt, and recognizing the document image, comprising:

a character element extracting step for referring to the document image, and extracting a set of character from the document image;

a line candidate extracting means for referring to the extracted set of character elements, and extracting a candidates for horizontal character line and a candidate for a vertical character lines;

a line reliability estimation means for estimating reliability of the extracted candidate for character line;

line extraction means for extracting a set of probably lines based on the estimated reliability; and tilt estimation means for estimating a tilt of the document image based on an arrangement of character elements contained in the extracted set of probable lines.

2. The apparatus according to claim 1 wherein:

said character element extraction means defines a set of connected components of black pixels in the document image as a candidate for a set of character elements to be extracted.

3. The apparatus according to claim 1 wherein:

said character element extraction means obtains a rectangle enclosing each connected component of black pixels in the document image, and defines a set of enclosing rectangles which overlap and are integrated into each other as a candidate for a set of character elements to be extracted.

4. The apparatus according to claim 1 wherein:

said line reliability estimation means quantitatively computes probability of a line for the candidate for a line, obtains a direction of a character by comparing probability of a horizontal character line with probability of a vertical character line of the candidate for a line to which each character element belongs, and defines as reliability of the candidate for a line a ratio of character elements in a character direction matching a line direction of the candidate for a line to character elements belonging to the candidate for a line.

5. The apparatus according to claim 1 wherein:

said tilt estimation means estimates the tilt by a least squares method by substituting a plurality of straight lines based on coordinates of a reference side of a rectangle enclosing character elements belonging to a set of probable lines.

6. A computer-readable storage medium storing a program which directs a computer to detect a tilt of a document image stored as electronic data, amend the tilt, and recognize the document image, said program comprising:

a character element extracting step for referring to the document image, and extracting a set of character elements from the document image;

a line candidate extracting step for referring to the extracted set of character elements, and extracting candidates for horizontal character lines and vertical character lines from the set of character elements;

a line reliability estimating step for estimating reliability of the extracted candidates for lines;

a line extracting step for extracting a set of probable lines based on the estimated reliability; and a tilt estimating step for estimating a tilt of the document image based on an arrangement of character elements contained in the extracted set of probable lines.

7. A method for detecting a tilt of a document image stored as electronic data, amending the tilt, and recognizing the document image, comprising;

a character element extracting step for referring to the document image, and extracting a set of character elements from the document image;

a line candidate extracting step for referring to the extracted set of character elements, and extracting candidates for horizontal character lines and vertical character lines from the set of character elements;

a line reliability estimating step for estimating reliability of the extracted candidates for each respective horizontal character line and vertical character line;

a line extracting step for extracting a set of probable lines based on the estimated reliability; and a tilt extimating step for estimating a tilt of the document image based on a an arrangement of character elements contained in the extracted set of probable lines.

* * * * *